United States Patent
Le Saint et al.

(10) Patent No.: US 12,021,987 B2
(45) Date of Patent: *Jun. 25, 2024

(54) METHODS FOR SECURE CRYPTOGRAM GENERATION

(71) Applicant: Visa International Service Association, San Francisco, CA (US)

(72) Inventors: Eric Le Saint, Los Altos, CA (US); James Gordon, Lafayette, CA (US); Roopesh Joshi, San Ramon, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/156,933

(22) Filed: Jan. 19, 2023

(65) Prior Publication Data

US 2023/0231715 A1     Jul. 20, 2023

Related U.S. Application Data

(63) Continuation of application No. 17/308,749, filed on May 5, 2021, now Pat. No. 11,588,637, which is a (Continued)

(51) Int. Cl.
*H04L 29/00* (2006.01)
*H04L 9/08* (2006.01)
(Continued)

(52) U.S. Cl.
CPC ............ *H04L 9/321* (2013.01); *H04L 9/0841* (2013.01); *H04L 9/0861* (2013.01); (Continued)

(58) Field of Classification Search
CPC ..... H04L 9/321; H04L 9/0841; H04L 9/0861; H04L 9/0891; H04L 9/14; H04L 63/061
See application file for complete search history.

(56) References Cited

U.S. PATENT DOCUMENTS 6,453,159 B1    9/2002  Lewis
7,254,232 B2    8/2007  DiSanto et al.
(Continued)

FOREIGN PATENT DOCUMENTS

AU       2004324546 A1    5/2006
CN       101286842 A     10/2008
(Continued)

OTHER PUBLICATIONS

"Tomorrow's Transactions", HCE and BLE University, London, Consult Hyperion, Available Online at: http://tomorrowstransactions.com, Mar. 20, 2014, 18 pages.
(Continued)

*Primary Examiner* — Ghazal B Shehni
(74) *Attorney, Agent, or Firm* — Kilpatrick Townsend & Stockton LLP

(57) ABSTRACT

A computer-implemented method performed by a user device is provided. The computer-implemented method includes receiving a message including an encrypted credential from a server computer; determining a response shared secret using a private key and a server public key; decrypting the encrypted credential using the response shared secret to determine a credential; obtaining a key derivation parameter from the credential; determining a first cryptogram key using the key derivation parameter; generating a first cryptogram using the first cryptogram key; and sending the first cryptogram to a second computer.

20 Claims, 19 Drawing Sheets

Related U.S. Application Data continuation of application No. 16/443,610, filed on Jun. 17, 2019, now Pat. No. 11,032,075, which is a continuation of application No. 15/723,001, filed on Oct. 2, 2017, now Pat. No. 10,389,533, which is a continuation of application No. 14/841,589, filed on Aug. 31, 2015, now Pat. No. 9,813,245.

(60) Provisional application No. 62/044,172, filed on Aug. 29, 2014.

(51) Int. Cl.
    *H04L 9/14* (2006.01)
    *H04L 9/32* (2006.01)
    *H04L 9/40* (2022.01)

(52) U.S. Cl.
    CPC .............. *H04L 9/0891* (2013.01); *H04L 9/14* (2013.01); *H04L 63/061* (2013.01)

(56) References Cited

U.S. PATENT DOCUMENTS

| | | |
|---|---|---|
| 7,627,760 B2 | 12/2009 | Lauter et al. |
| H2270 H | 6/2012 | Le Saint et al. |
| 8,200,974 B1 | 6/2012 | DiSanto et al. |
| 8,447,990 B2 | 5/2013 | Utin |
| 8,904,180 B2 | 12/2014 | Allen et al. |
| 9,813,245 B2 | 11/2017 | Le Saint et al. |
| 10,389,533 B2 | 8/2019 | Le Saint et al. |
| 10,461,933 B2 | 10/2019 | Le Saint et al. |
| 11,032,075 B2 | 6/2021 | Le Saint et al. |
| RE49,012 E | 4/2022 | Harkins |
| 2003/0005317 A1 | 1/2003 | Audebert et al. |
| 2003/0115453 A1 | 6/2003 | Grawrock |
| 2004/0017499 A1 | 1/2004 | Ambiru |
| 2004/0174997 A1 | 9/2004 | Yamamichi et al. |
| 2005/0084114 A1 | 4/2005 | Jung et al. |
| 2005/0149732 A1 | 7/2005 | Freeman et al. |
| 2005/0154873 A1 | 7/2005 | Cam-winget et al. |
| 2006/0242407 A1 | 10/2006 | Kimmel et al. |
| 2006/0265595 A1 | 11/2006 | Scottodiluzio |
| 2007/0028090 A1 | 2/2007 | Lopez et al. |
| 2007/0033403 A1 | 2/2007 | Lauter et al. |
| 2007/0288743 A1 | 12/2007 | Cam-Winget et al. |
| 2008/0040603 A1 | 2/2008 | Stedron |
| 2008/0133918 A1 | 6/2008 | You et al. |
| 2009/0006019 A1 | 1/2009 | Kang et al. |
| 2009/0044019 A1 | 2/2009 | Lee et al. |
| 2009/0060197 A1 | 3/2009 | Taylor et al. |
| 2009/0318114 A1 | 12/2009 | Bertoni |
| 2010/0100724 A1 | 4/2010 | Kaliski, Jr. |
| 2011/0307698 A1 | 12/2011 | Vanstone |
| 2012/0029444 A1 | 2/2012 | Anderson et al. |
| 2012/0082312 A1 | 4/2012 | Liu et al. |
| 2012/0087493 A1 | 4/2012 | Chidambaram et al. |
| 2012/0137132 A1 | 5/2012 | Le Saint |
| 2012/0144193 A1 | 6/2012 | Le Saint et al. |
| 2012/0221858 A1 | 8/2012 | Struik |
| 2012/0294445 A1 | 11/2012 | Radutskiy et al. |
| 2012/0314865 A1 | 12/2012 | Kitchen |
| 2013/0008076 A1 | 1/2013 | Stenklyft |
| 2013/0016831 A1 | 1/2013 | Lambert et al. |
| 2013/0080768 A1 | 3/2013 | Lagerway et al. |
| 2013/0091353 A1 | 4/2013 | Zhang et al. |
| 2013/0111209 A1 | 5/2013 | Harkins |
| 2013/0195271 A1 | 8/2013 | Miyabayashi et al. |
| 2013/0219189 A1 | 8/2013 | Simmons |
| 2013/0254119 A1* | 9/2013 | Hayhow ............... G06Q 20/02 705/71 |
| 2013/0301828 A1 | 11/2013 | Gouget et al. |
| 2013/0326235 A1 | 12/2013 | Meister |
| 2013/0332739 A1 | 12/2013 | Yi et al. |
| 2014/0003604 A1 | 1/2014 | Campanga et al. |
| 2014/0009308 A1 | 1/2014 | Abuelsaad et al. |
| 2014/0013121 A1 | 1/2014 | Sherkin et al. |
| 2014/0093084 A1 | 4/2014 | De Atley et al. |
| 2014/0108262 A1 | 4/2014 | Plateaux et al. |
| 2014/0189351 A1* | 7/2014 | Steely ................... G06F 21/608 713/168 |
| 2014/0208117 A1 | 7/2014 | Hayashi et al. |
| 2014/0281542 A1 | 9/2014 | Bono et al. |
| 2014/0365776 A1 | 12/2014 | Smets et al. |
| 2015/0019443 A1 | 1/2015 | Sheets et al. |
| 2015/0088756 A1 | 3/2015 | Makhotin et al. |
| 2015/0200774 A1 | 7/2015 | Le Saint |
| 2015/0339664 A1* | 11/2015 | Wong .................. H04L 63/0823 705/71 |
| 2015/0372811 A1 | 12/2015 | Le Saint et al. |
| 2016/0065370 A1 | 3/2016 | Le Saint et al. |
| 2016/0149705 A1 | 5/2016 | Bobinski et al. |
| 2016/0218875 A1 | 7/2016 | Le Saint et al. |
| 2018/0026787 A1 | 1/2018 | Le Saint et al. |

FOREIGN PATENT DOCUMENTS

| | | |
|---|---|---|
| CN | 102656599 A | 9/2012 |
| CN | 103201624 A | 7/2013 |
| EP | 1906587 A2 | 4/2008 |
| EP | 2073430 A1 | 6/2009 |
| EP | 2434715 A1 | 3/2012 |
| KR | 1020080074956 A | 8/2008 |
| RU | 2364049 C2 | 8/2009 |
| WO | 9949613 A1 | 9/1999 |
| WO | 2013023968 A1 | 2/2013 |
| WO | 2014109283 A1 | 7/2014 |
| WO | 2016123264 A1 | 8/2016 |
| WO | 2017214288 A1 | 12/2017 |

OTHER PUBLICATIONS

U.S. Appl. No. 14/743,874 , "U.S. Appl. No.", Efficient Methods for Authenticated Communication, filed Jun. 18, 2015, 85 pages.
U.S. Appl. No. 14/841,589 , Non-Final Office Action, dated Dec. 16, 2016, 11 pages.
U.S. Appl. No. 14/841,589 , Notice of Allowance, dated Jun. 30, 2017, 8 pages.
U.S. Appl. No. 15/008,388 , Non-Final Office Action, dated Jan. 24, 2019, 17 pages.
U.S. Appl. No. 15/008,388 , Notice of Allowance, dated Jun. 12, 2019, 11 pages.
U.S. Appl. No. 15/723,001 , "Corrected Notice of Allowability", dated Jul. 22, 2019, 2 pages.
U.S. Appl. No. 15/723,001 , Final Office Action, dated Nov. 28, 2018, 7 pages.
U.S. Appl. No. 15/723,001 , Non-Final Office Action, dated Mar. 9, 2018, 13 pages.
U.S. Appl. No. 15/723,001 , Notice of Allowance, dated Mar. 20, 2019, 6 pages.
U.S. Appl. No. 16/443,610 , Final Office Action, dated Nov. 17, 2020, 6 pages.
U.S. Appl. No. 16/443,610 , Non-Final Office Action, dated Jul. 7, 2020, 5 pages.
U.S. Appl. No. 16/443,610 , Notice of Allowance, dated Feb. 3, 2021, 8 pages.
U.S. Appl. No. 16/566,651 , Notice of Allowance, dated Aug. 11, 2021, 10 pages.
AU2015308608 , "First Examination Report", dated Dec. 11, 2018, 3 pages.
AU2016211551 , "First Examination Report", dated Sep. 19, 2019, 3 pages.
AU2019240671 , "First Examination Report", dated Dec. 1, 2020, 4 pages.
AU2021203815 , "Notice of Acceptance", dated May 23, 2022, 3 pages.
Application No. BR1120170146320 , Office Action, dated Jul. 28, 2020, 7 pages.
Application No. CN201580046148.1 , Notice of Decision to Grant, dated Apr. 7, 2020, 5 pages.

(56) References Cited

OTHER PUBLICATIONS

Application No. CN201580046148.1, Office Action, dated Oct. 9, 2019, 10 pages.
Application No. CN201680007305.2, Notice of Decision to Grant, dated Aug. 4, 2020, 4 pages.
Application No. CN201680007305.2, Office Action, dated Jan. 3, 2020, 18 pages.
Application No. EP15835007.4, Extended European Search Report, dated Feb. 9, 2018, 8 pages.
Application No. EP15835007.4, Notice of Decision to Grant, dated Feb. 6, 2020, 2 pages.
Application No. EP15835007.4, Office Action, dated Feb. 14, 2019, 7 pages.
Application No. EP16744062.7, Extended European Search Report, dated Jul. 6, 2018, 10 pages.
Application No. EP16744062.7, Notice of Decision to Grant, dated Jul. 23, 2020, 2 pages.
Application No. EP16818857.1, Extended European Search Report, dated May 14, 2018, 9 pages.
Garrett et al., "Blinded Diffie-Hellman Preventing Eavesdroppers from Tracking Payments", International Conference on Financial Cryptography and Data Security, Dec. 16, 2014, pp. 79-92.
Application No. PCT/US2015/047824, International Search Report and Written Opinion, dated Dec. 8, 2015, 11 pages.
Application No. PCT/US2016/015218, International Search Report and Written Opinion, dated May 12, 2016, 17 pages.
Application No. PCT/US2017/036380, International Search Report and Written Opinion, dated Oct. 13, 2017, 12 pages.
RU2017106105, "Notice Of Decision to Grant", dated Oct. 23, 2019, 22 pages.
Application No. RU2017106105, Office Action, dated Mar. 13, 2019, 15 pages.
Application No. SG11201704984S, Notice of Decision to Grant, dated Apr. 18, 2018, 8 pages.
U.S. Appl. No. 17/308,749, Non-Final Office Action, dated Aug. 29, 2022, 9 pages.
U.S. Appl. No. 17/308,749, Notice of Allowance, dated Oct. 19, 2022, 9 pages.
U.S. Appl. No. 17/522,818, Non-Final Office Action, dated Apr. 28, 2023, 9 pages.
Application No. CN202010573686.9, Office Action, dated Jan. 3, 2023, with English Translation, 10 pages.
U.S. Appl. No. 17/522,818, Notice of Allowance, dated Aug. 18, 2023, 10 pages.
Application No. CN202011108897.1, Notice of Decision to Grant, dated Oct. 7, 2023, 6 pages.
AU2022224799, "First Examination Report", dated May 5, 2023, 3 pages.

* cited by examiner

METHODS FOR SECURE CRYPTOGRAM GENERATION

CROSS-REFERENCE TO RELATED APPLICATIONS

This application is a continuation of U.S. application Ser. No. 17/308,749, filed May 5, 2021, which is a continuation of U.S. application Ser. No. 16/443,610, filed Jun. 17, 2019, which is a continuation of U.S. application Ser. No. 15/723,001, filed Oct. 2, 2017, which is a continuation of U.S. application Ser. No. 14/841,589, filed Aug. 31, 2015, which claims the benefit of the filing date of U.S. Provisional Application 62/044,172, filed Aug. 29, 2014. The above-named applications are incorporated by reference herein in their entireties.

BACKGROUND

As user devices such as NFC-enabled mobile phones and contactless cards continue to increase in popularity, maintaining the security of payment and other transactions continues to be a concern. For instance, in order to conduct a payment transaction, it is typically necessary to authenticate the user device. One method for authenticating a user device is through the use of a cryptogram generated by the device. A cryptogram may be an encrypted data element that can be validated for authenticity by a trusted entity, such as a payment network or other entity that authorizes a transaction (e.g., access to a document or a building). However, an attacker may attempt to eavesdrop on a transaction (e.g., by conducting man-in-the-middle attack). Thus, an attacker may attempt to intercept a cryptogram transmitted by the user. If determined, the cryptogram could be used for illicit purposes.

Further complicating matters is the security of the user device itself. In some cases, the user device may be compromised or otherwise untrustworthy, so that it would be inadvisable to store persistent secure credentials, such as a static cryptogram generation key on the device. Conducting a secure transaction in such circumstances may pose a challenge.

Embodiments of the present invention address these problems and other problems individually and collectively.

SUMMARY

Embodiments of the invention relate to systems and methods for securely generating a cryptogram. In some embodiments, implementation for the cryptogram generation methods described herein can be unique or with limited scope to devices without secure elements or specific hardware protection for secrets. For a given protected value, devices that are configured identically and devices that do not have hardware protecting secrets are subject to a higher threat. In some embodiments, a user device can be configured to determine an ephemeral key pair including an ephemeral public key and an ephemeral private key, generate a first shared secret using the ephemeral private key and a static server computer public key, encrypt request data using the first shared secret to obtain encrypted request data, and send a provisioning request message including the encrypted request data and the ephemeral public key to a server computer.

The server computer can be configured to receive the provisioning request message including the encrypted request data and the ephemeral public key from the user device, generate the first shared secret using the ephemeral public key and a static server computer private key, decrypt the encrypted request data using the first shared secret to obtain request data, generate a second shared secret using a blinded static server computer private key and the ephemeral public key, encrypt the credentials using the second shared secret to determine encrypted response data, and send a provisioning response message to the user device, the provisioning response message including the encrypted response data and a blinded static server computer public key. In some embodiments, the static server computer private key is not blinded. Instead, the second shared secret can be generated using the static server computer private key and the blinded ephemeral public key.

The user device can be configured to receive the provisioning response message including credentials and a blinded static server computer public key from the server computer, determine the second shared secret using the ephemeral private key and the blinded static server computer public key, and decrypt the encrypted credentials using the second shared secret to determine credentials. In some embodiments, the credentials may be encrypted or decrypted using a second session key derived from the second shared secret.

The payload data or credentials may include key derivation parameters that may or may not include a limited use key (LUK). The key derivation parameters (which may or may not include the LUK) may be used to derive a cryptogram key that can be used to generate a cryptogram for conducting a transaction.

The payload data or credentials may also include update parameters that may be used by the user device to generate an updated shared secret based on a previous shared secret. In some embodiments, the key derivation parameters may be substantially the same as the update parameters. In some other embodiments, the key derivation parameters may be different than the update parameters. The key derivation parameters and/or the update parameters may be unique per user device or per group of user devices so as to prevent mass offline attacks.

The payload data or credentials may also include cryptogram derivation parameters that specify how to derive cryptograms (e.g., using cryptogram keys).

The key derivation parameters, cryptogram derivation parameters, and/or the update parameters may include a LUK, a specification of which transaction parameters from a given transaction to use, code for performing the derivation (or an identifier of which derivation procedure to use) and/or other information related to these parameters. The code can be implemented via a personalized derivation method in that it is unique to a device or group of devices, and may be assigned randomly. The code can be signed by the server or other vendor, so that the user device can authenticate the code.

The credentials may also include one or more additional shared secret and/or keys (such as a limited use key (LUK)) shared with server computers (e.g., provisioning server and/or validation server). Such shared secret and/or keys are preferably unique to a specific user device or a group of user devices.

For some embodiments, a method is disclosed including determining an updated shared secret using a previous shared secret, deriving a cryptogram key using the updated shared secret, encrypting transaction data to generate a transaction cryptogram, and sending the transaction cryptogram to a server computer.

Other embodiments are directed to systems, portable consumer devices, and computer readable media associated with methods described herein.

A better understanding of the nature and advantages of embodiments of the present invention may be gained with reference to the following detailed description and the accompanying drawings.

TERMS

Figure 1:
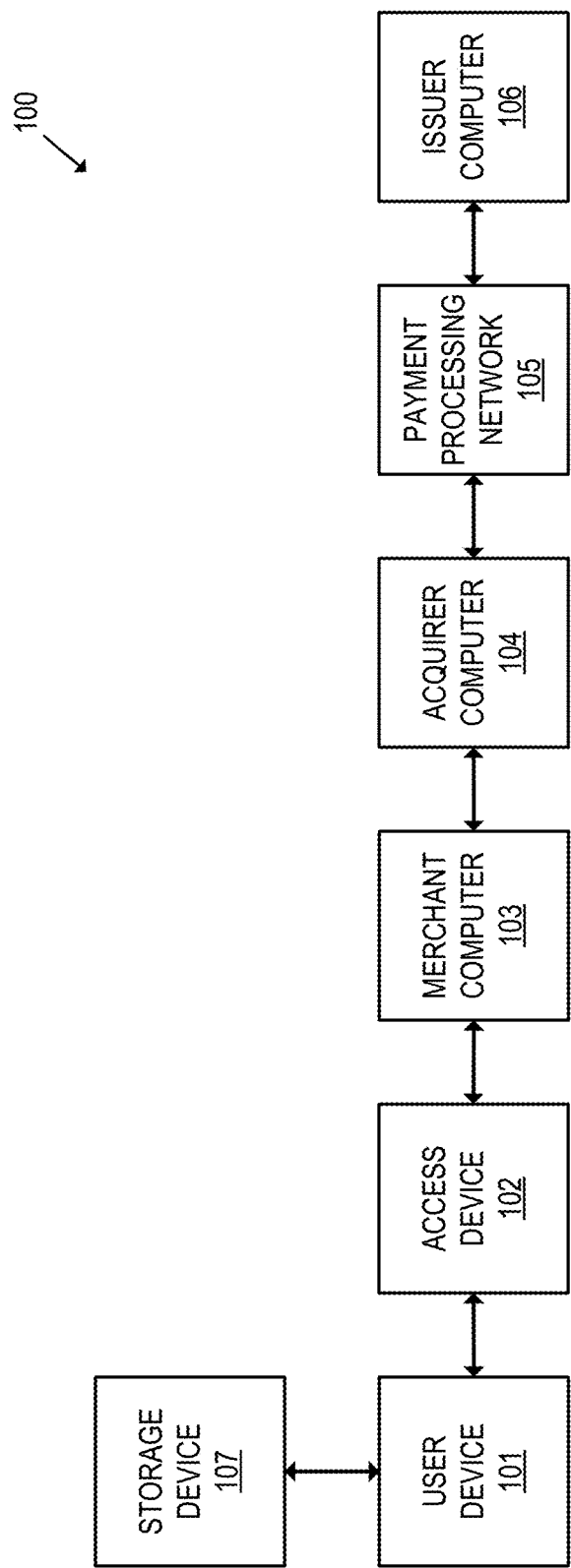
FIG. 1 shows an example payment system, in accordance with some embodiments.

Prior to discussing embodiments of the invention, description of some terms may be helpful in understanding embodiments of the invention.

The term "server computer" may include a computer or cluster of computing devices. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers (e.g., user devices). The server computer may include one or more computational apparatuses and may use any of a variety of computing structures, arrangements, and compilations for servicing the requests from one or more client computers.

The term "public/private key pair" may include a pair of linked cryptographic keys generated by an entity. The public key may be used for public functions such as encrypting a message to send to the entity or for verifying a digital signature which was supposedly made by the entity. The private key, on the other hand may be used for private functions such as decrypting a received message or applying a digital signature. The public key will usually be authorized by a body known as a Certification Authority (CA) which stores the public key in a database and distributes it to any other entity which requests it. The private key will typically be kept in a secure storage medium and will usually only be known to the entity. However, the cryptographic systems described herein may feature key recovery mechanisms for recovering lost keys and avoiding data loss. Public and private keys may be in any suitable format, including those based on RSA or elliptic curve cryptography (ECC).

A "digital signature" may refer to the result of applying an algorithm based on a public/private key pair, which allows a signing party to manifest, and a verifying party to verify, the authenticity and integrity of a document. The signing party acts by means of the private key and the verifying party acts by means of the public key. This process certifies the authenticity of the sender, the integrity of the signed document and the so-called principle of nonrepudiation, which does not allow disowning what has been signed. A certificate or other data that includes a digital signature by a signing party is said to be "signed" by the signing party.

A "certificate" or "digital certificate" may include an electronic document or data file that uses a digital signature to bind a public key with data associated with an identity. The certificate may include one or more data fields, such as the legal name of the identity, a serial number of the certificate, a valid-from and valid-to date for the certificate, certificate-related permissions, etc. A certificate may contain a "valid-from" date indicating the first date the certificate is valid, and a "valid-to" date indicating the last date the certificate is valid. A certificate may also contain a hash of the data in the certificate including the data fields. Unless otherwise noted, each certificate is signed by a certificate authority.

A "certificate authority" (CA) may include one or more server computers operatively coupled to issue certificates to entities. The CA may prove its identity using a CA certificate, which includes the CA's public key. The CA certificate may be signed by another CA's private key, or may be signed by the same CA's private key. The latter is known as a self-signed certificate. The CA may maintain a database of all certificates issued by the CA, and may also maintain a list of revoked certificates.

In a typical process, the certificate authority receives an unsigned certificate from an entity whose identity is known. The unsigned certificate includes a public key, one or more data fields, and a hash of the data in the certificate. The CA signs the certificate with a private key corresponding to the public key included on the CA certificate. The CA may then store the signed certificate in a database, and issue the signed certificate to the entity.

A "cryptographic nonce" may include any number, string, bit sequence, or other data value intended to be used in association with a single communication session. In some cases, a cryptographic nonce may be randomly or pseudo-randomly generated. For example, the cryptographic nonce can be a random number. Typically, a cryptographic nonce is of sufficient length as to make insignificant the likelihood of independently generating the same nonce value multiple times.

A "blinded key," such as a "blinded public key" may include a key that has been obfuscated or otherwise modified from its original value by combination with another data element, such as a cryptographic nonce. For example, in elliptic curve cryptography, a public key may be multiplied by the nonce to generate a "blinded public key." Similarly, a private key may be multiplied by the nonce to generate a "blinded private key."

An "ephemeral key pair" may include a public key (i.e., an "ephemeral public key") and a private key (i.e., an "ephemeral private key) generated for use with a single transaction or other communication session. The ephemeral key pair may be of any suitable format, such as ECC or RSA. Typically, an ephemeral key pair may be deleted once the transaction or communication session has concluded.

A "static key pair" may include a public key (i.e., a "static public key") and a private key (i.e., a "static private key") maintained over a period of time. Typically, though not necessarily, a static private key may be stored securely, such as in a hardware security module (HSM) or secure element (SE). Typically, though not necessarily, a static public key may be bound to an identity through the use of a digital certificate. The static key pair may be of any suitable format, such as ECC or RSA.

A "shared secret" may include any data value or other information known only to authorized parties in a secure communication. A shared secret can be generated in any suitable manner, from any suitable data. For example, a Diffie-Hellman based algorithm, such as Elliptic-Curve Diffie-Hellman (ECDH) may be used to generate a shared secret from a private key and a public key. In some cases, a shared secret may be used to generate a session key.

The term "identification data" may include any data or information associated with a user or device. Examples of identification data may include a name of a user associated with the device, an organization associated with the device, payment information such as a primary account number (PAN) or token associated with the device, an expiration date of the PAN or token, a certificate associated with the device, an IMEI or serial number of the device, etc.

The term "authentication data" may include any data or information suitable to authenticate a user or device. Examples of authentication data may include a password or passphrase, a cryptographic key (e.g., a private key), a certificate, biometric data associated with a user (e.g., fingerprint, voice, facial image, iris/retina scan), and the like.

An "identification factor" may include any data or information determined from identification data and/or authentication data. Typically, though not necessarily, the identification factor may be generated by hashing a combination of identification data and authentication data.

An "encryption key" may include any data value or other information suitable to cryptographically encrypt data. A "decryption key" may include any data value or other information suitable to decrypt encrypted data. In some cases, the same key used to encrypt data may be operable to decrypt the data. Such a key may be known as a symmetric encryption key.

A "session key" may include any key used to encrypt or decrypt data to be securely communicated. In some cases, a session key may be generated from a shared secret known both to a sending entity and a receiving entity. For example, the session key may be derived using a key derivation function and the shared secret. A session key can be used to protect data included in a request or response message. In such cases, a session key can also be referred to as a message protection key.

A "limited use key" (LUK) may include any encryption key or other data that may be used a limited number of times. An LUK may be used for any suitable purpose. For example, in some embodiments, an LUK may be used to generate a cryptogram for a transaction.

A "single use key" (SUK) is a LUK that can be only used once. For example, a SUK may be used to encrypt and/or decrypt data related to a single transaction. In some embodiments, a SUK can be derived from a LUK.

A "cryptogram" may include any data element or other information used to authenticate an entity such as a device or a user. For example, a cryptogram may include static (i.e., predetermined) data, dynamic data, or a combination of the two that is encrypted using an encryption key (e.g., an LUK). A cryptogram may be used in any suitable context. For example, a "registration cryptogram" may include a cryptogram that is used to confirm the registration of an entity. A "transaction cryptogram" may include a cryptogram that is used to authenticate an entity conducting a transaction.

DETAILED DESCRIPTION

Embodiments of the invention introduce efficient methods for securely generating a cryptogram by a user device, and validating the cryptogram by a server computer. In some embodiments, a transaction can be conducted whereby a user device provides a cryptogram without requiring the user device to persistently store an encryption key or other sensitive data used to generate the cryptogram. For example, the user device and server computer can mutually authenticate and establish a shared secret. Using the shared secret, the server computer can derive a session key and transmit key derivation parameters encrypted using the session key to the user device. The user device can also derive the session key using the shared secret, decrypt the encrypted key derivation parameters, and store the key derivation parameters.

At the time of a transaction, the user device can use the key derivation parameters and the shared secret to generate a single use cryptogram key. The cryptogram key can be used to generate a cryptogram. The cryptogram can be used to conduct the transaction. For example, the cryptogram can be included in an authorization request message for the transaction. After the cryptogram is generated, an updated shared secret can be determined, and the shared secret and cryptogram key used to generate the cryptogram can be deleted. Thus, in some embodiments, after a transaction is conducted, the cryptogram may be un-derivable.

In the unlikely event that the user device is compromised or otherwise deemed untrustworthy, a key renewal process can be performed. The key renewal process may include a second mutual authentication process. For example, the user device may provide data encrypted using a cryptogram key and/or additional authentication data such as a username, password, one-time password, etc. Once the user device has re-authenticated, a new shared secret can be established between the user device and server computer. In addition, the server computer can provide new key derivation parameters to the user device. In some embodiments, the user device can confirm registration by providing a cryptogram (e.g., a registration cryptogram) generated using the shared secret to the server computer.

Embodiments of the invention can enable the use of a one-time use cryptogram key used to generate a cryptogram. Using a one-time cryptogram key in accordance with embodiments can provide several advantages. For example, embodiments can mitigate the risk of compromise of a cryptogram key. If each cryptogram key is single use key, a second cryptogram generated using a cryptogram key can be easily determined to be invalid. Thus, even if a hacker were able to steal a cryptogram key, the hacker would be able to use the key for at most one transaction.

Embodiments of the invention can provide the further advantage of associating key derivation parameters with user devices. This may provide an extra layer of security, so that even if a shared secret was compromised for one device, a corresponding cryptogram key may not be derivable at a server computer without the same key derivation parameters. Further, since different devices may have different key derivation parameters, even if an attacker reverse-engineered the key derivation algorithm on a user device, that knowledge may not be helpful in compromising a server computer.

The above examples highlight only a few of the advantages provided by embodiments of the invention.

I. Systems

Embodiments are usable with various authorization systems, e.g., payments systems, document access system, building access system, and the like. Although examples of payment systems are described, embodiments are equally applicable for other authorization systems.

A. Payment System

FIG. 1 shows an example payment system 100, in accordance with some embodiments. The system includes a user (not shown) who may operate a user device 101. The user may use user device 101 to conduct payment transactions in communication with an access device 102. As used herein, a "user device" may include a desktop computer, laptop computer, mobile phone, tablet, credit card, debit card, or any suitable computing device. As used herein, an "access device" may include any computing device, such as a point of sale (POS) terminal or web server, suitable to communicate with a user device. In some embodiments, access device 102 may directly communicate with user device 101. In other embodiments, access device 102 may communicate to user device 101 via an interface device, such as a smart watch, smart glasses, or any other suitable device. Access device 102 may be connected to merchant computer 103, which may be connected to acquirer computer 104. Acquirer computer 104 may be connected to issuer computer 106 via payment processing network 105. The user device 101 may optionally communicate with a storage device 107 that may be operably connected to the user device 101. The storage device 107 may include or be included in any suitable local or remote data storage server, system, or service that is provided by a storage provider. The storage provider may not be the same entity that provides devices 101-106. For example, the storage device 107 may be part of a cloud-based storage service provided by an external cloud-storage provider. Any or all of devices 101-107 may be implemented using one or more computing devices such as server computers.

As used herein, an "issuer" may typically refer to a business entity (e.g., a bank) that maintains financial accounts for a user and often issues or provisions a user device 101, such as a credit or debit card, or mobile device, to the user. A "merchant" is typically an entity that engages in transactions and can sell goods or services. An "acquirer" is typically a business entity (e.g., a commercial bank) that has a business relationship with a particular merchant or other entity. Some entities can perform both issuer and acquirer functions. Some embodiments may encompass such single entity issuer-acquirers. Each of the entities may include one or more computer apparatuses (e.g., access device 102, merchant computer 103, acquirer computer 104, payment processing network 105, and issuer computer 106) to enable communication or to perform one or more of the functions described herein.

The payment processing network 105 may include data processing subsystems, networks, and operations used to support and deliver certificate authority services, authorization services, exception file services, transaction scoring services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

The payment processing network 105 may include one or more server computers. A server computer is typically a powerful computer or cluster of computers. For example, the server computer can be a large mainframe, a minicomputer cluster, or a group of servers functioning as a unit. In one example, the server computer may be a database server coupled to a Web server. The payment processing network 105 may use any suitable wired or wireless network, including the Internet.

In some payment transactions, the user purchases a good or service at a merchant using a user device 101. User device 101 can interact with an access device 102 at a merchant associated with merchant computer 103. For example, the user may tap user device 101 against an NFC reader in the access device 102. Alternatively, the user may indicate payment details to the merchant over a computer network, such as in an online or e-commerce transaction.

An authorization request message for a transaction may be generated by access device 102 or merchant computer 103 and then forwarded to the acquirer computer 104. After receiving the authorization request message, the acquirer computer 104 sends the authorization request message to the payment processing network 105. The payment processing network 105 then forwards the authorization request message to the corresponding issuer computer 106 associated with an issuer associated with the user or user device 101.

An "authorization request message" may be an electronic message that is sent to a payment processing network and/or an issuer to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also include additional data elements corresponding to "identification information" including, by way of example only: a service code, a CVV (card verification value), a dCVV (dynamic card verification value), an expiration date, etc. An authorization request message may also include "transaction information," such as any information associated with a current transaction, such as the transaction amount, merchant identifier, merchant location, etc., as well as any other information that may be utilized in determining whether to identify and/or authorize a transaction. The authorization request message may also include other information such as information that identifies the access device that generated the authorization request message, information about the location of the access device, etc.

After the issuer computer 106 receives the authorization request message, the issuer computer 106 sends an authorization response message back to the payment processing network 105 to indicate whether the current transaction is authorized (or not authorized). The payment processing network 105 then forwards the authorization response message back to the acquirer computer 104. In some embodiments, payment processing network 105 may decline the transaction even if issuer computer 106 has authorized the transaction, for example depending on a value of the fraud risk score. The acquirer computer 104 then sends the response message back to the merchant computer 103.

An "authorization response message" may be an electronic message reply to an authorization request message generated by an issuer computer 106 and/or a payment processing network 105. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that an issuer returns in response to an authorization request message in an electronic message (either directly or through the payment processing network 105) to the merchant computer 103 that indicates approval of the transaction. The code may serve as proof of authorization. As noted above, in some embodiments, a payment processing network 105 may generate or forward the authorization response message to the merchant, typically via acquirer computer 104.

After the merchant computer 103 receives the authorization response message, the merchant computer 103 may then provide the authorization response message for the user. The response message may be displayed by the access device 102, or may be printed out on a physical receipt. Alternately, if the transaction is an online transaction, the merchant may provide a web page or other indication of the authorization response message as a virtual receipt. The receipts may include transaction data for the transaction.

At the end of the day, a normal clearing and settlement process can be conducted by the payment processing network 105. A clearing process is a process of exchanging financial details between an acquirer and an issuer to facilitate posting to a customer's payment account and reconciliation of the user's settlement position.

B. User Device

Figure 2:
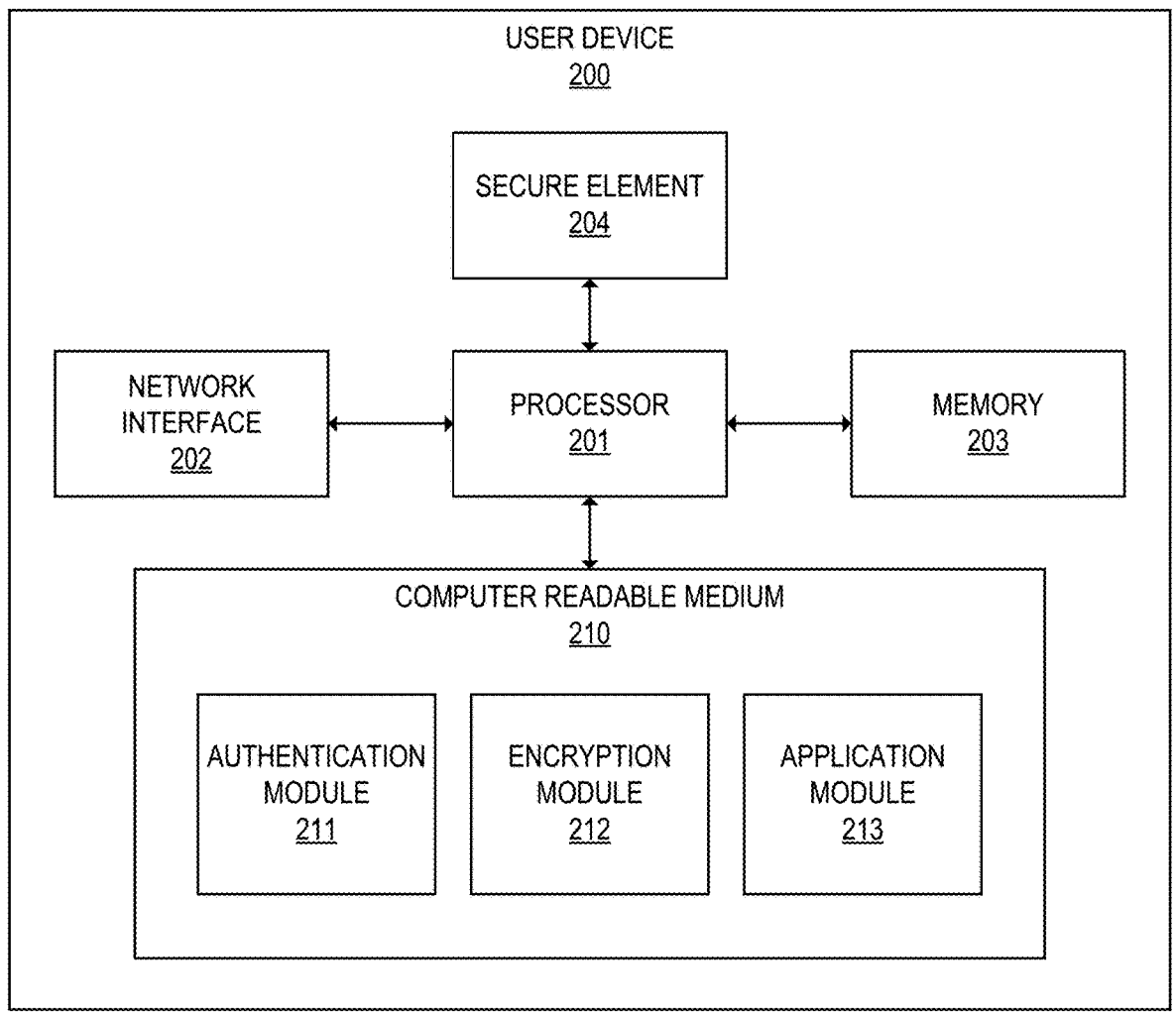
FIG. 2 shows an example of a user device, in accordance with some embodiments.

FIG. 2 shows an example of a user device 200, in accordance with some embodiments. For example, the user device 200 may include or be included in the user device 101 described in FIG. 1. Examples of user devices 200 may include mobile phones, tablets, desktop and laptop computers, wearable devices (e.g., smart watches, fitness bands, ankle bracelets, rings, earrings, etc.), or any other computing devices capable of receiving, storing, and transmitting data.

The user device 200 can be configured to communicate directly or indirectly with a server computer 300 to implement the methods described herein. User device 200 may include a processor 201 communicatively coupled to a network interface 202, a memory 203, a computer readable medium 210, and optionally, a secure element 204.

The processor 201 can include one or more CPUs, each of which may include at least one processor cores operable to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s). The CPU interacts with memory through signal passing through conductive conduits to execute stored signal program code according to conventional data processing techniques. In some cases, processor 201 can include multiple CPUs coupled over a network, such as in a distributed or cluster computing system.

The network interface 202 may be configured to allow computing device 200 to communicate with other entities such devices 101-107, other computing devices, etc. using one or more communications networks. Network interfaces may accept, communicate, and/or connect to a communications network. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. A communications network may be any one and/or the combination of the following: a direct interconnection; the Internet; a Local Area Network (LAN); a Metropolitan Area Network (MAN); a secured custom connection; a Wide Area Network (WAN); a wireless network (e.g., employing protocols such as, but not limited to a Wireless Application Protocol (WAP), I-mode, and/or the like); and/or the like.

The memory 203 may be used to store data and code. The memory 203 may be coupled to the processor 201 internally or externally (e.g., cloud based data storage), and may include any combination of volatile and/or non-volatile memory, such as RAM, DRAM, ROM, flash, or any other suitable memory device.

The secure element 204 may include a tamper-resistant module capable of securely hosting sensitive applications and/or data. Such applications and/or data may be related to payment applications, authentication/authorization, cryptographic key management, and the like. For example, some or all portions of credentials, cryptographic keys or key materials, cryptograms, shared secrets, account information, and the like, may be provisioned onto the secure element 204 of the user device 200 to protect against unauthorized access. In some embodiments, the secure element 204 may include or be included in any combination of software-based (such as host card emulation or HCE) and/or hardware-based (such as a hardware security module or HSM, a smart card, or chip card) security modules.

The computer readable medium 210 may be in the form of a memory (e.g., flash, ROM, etc.) and may include code, executable by the processor 201 for implementing the methods described herein. The computer readable medium 210 may include an authentication module 211, an encryption module 212, and an application module 213. In various embodiments, such modules may be configured to perform, individually or collectively, some or all of methods 400, 800, 1100, 1200, 1500, 1600, 1800 of FIGS. 4-5, 8, 11, 12, 15, and 18, respectively.

Authentication module 211 may include any program, software, or other code suitable to authenticate computing device 200 to another computing device, or authenticate another computing device at computing device 200. For example, authentication module 211 may be configured to generate and send an authentication request message to another computing device, and receive and process an authentication response message from the other computing devices. Similarly, authentication module 211 may be configured to receive and process an authentication request message from another computing device, and generate and send an authentication response message to the other computing device.

Encryption module 212 may include any program, software, or other code suitable to perform operations related to encryption and/or decryption. For example encryption module may be configured to generate a shared secret, such as using a key agreement protocol such as Diffie-Hellman. Encryption module 212 may be further configured to derive a session key from a shared secret, such as using a key derivation function (KDF). In some embodiments, encryption module 212 may be configured to store one or more static keys, such as a static user device private key or a static server computer private key. In some embodiments, encryption module 212 may be implemented using any combination of software (such as host card emulation or HCE) and hardware (such as a hardware security module or HSM).

Application module 213 may include any program, software, or other code suitable to run one or more applications. For example, application module 213 may include a payment application operable to conduct a payment transaction. In some embodiments, the payment application may be configured to allow a user to select goods and services to be purchased, obtain secure credentials (e.g., a cryptogram key) from an issuer of a payment account, and/or initiate or conduct a payment transaction (e.g., using the secure credentials).

It is understood that the components described herein are for illustration purposes only and not intended to be limiting. In various embodiments, more or less components than listed herein may be provided. For example, in an embodiment, the user device 200 may not include a secure element 204. In such an embodiment, sensitive or confidential data (e.g., cryptographic keys) may be stored (e.g., in encrypted form) in and/or retrieved from a storage device 107 that is operably connected to the user device 200. In some embodiments, the user device 200 may not include an application module 213.

C. Server Computer

Figure 3:
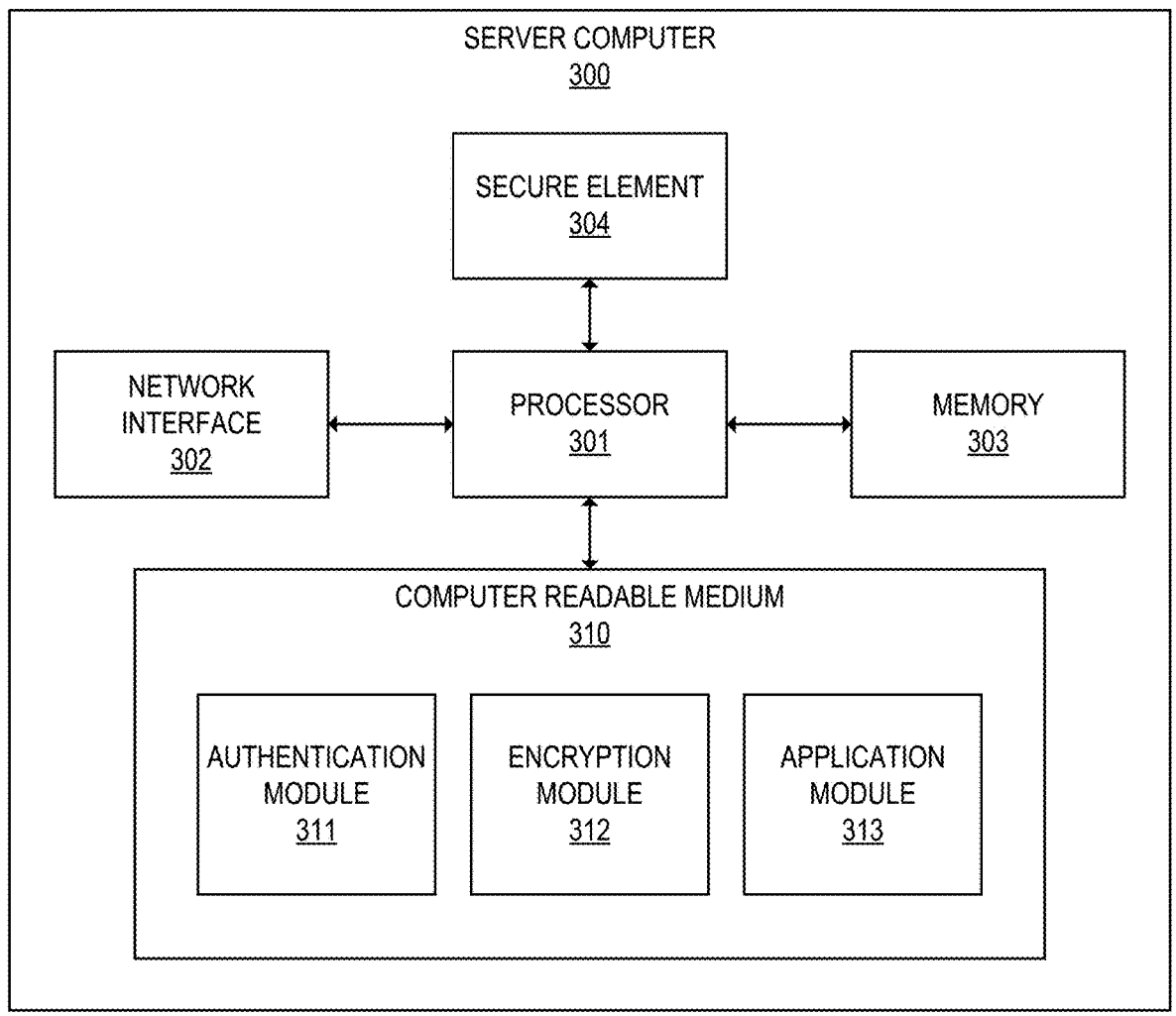
FIG. 3 shows an example of a server computer, in accordance with some embodiments.

FIG. 3 shows an example of a server computer 300, in accordance with some embodiments. For example, the server computer 300 may include or be included in any of the devices 102-106 described in FIG. 1. Examples of server computers 300 may include mobile phones, tablets, desktop and laptop computers, mainframe computers, or any other computing device suitable for receiving, storing, and transmitting data. The server computer 300 can be configured to communicate directly or indirectly with a user device 200 to implement the methods described herein. Server computer 300 may include a processor 301 communicatively coupled to a network interface 302, a memory 303, a computer readable medium 310, and optionally, a secure element 304.

The processor 301, network interface 302, memory 303 may be similar to the processor 201, network interface 202, and memory 203 of the user device 200. The computer readable medium 310 may be in the form of a memory (e.g., flash, ROM, etc.) and may include code, executable by the processor 301 for implementing the methods described herein. The computer readable medium 310 may include an authentication module 311, an encryption module 312, and an application module 313. In various embodiments, such modules may be configured to perform, individually or collectively, some or all of methods 600, 900, 1100, 1300, 1500, 1700, 1800 of FIGS. 6-7, 9, 11, 13, 15, 17, and 18, respectively.

Authentication module 311 may include any program, software, or other code suitable to authenticate computing device 300 to another computing device, or authenticate another computing device at computing device 300. For example, authentication module 311 may be configured to generate and send an authentication request message to another computing device, and receive and process an authentication response message from the other computing devices. Similarly, authentication module 311 may be configured to receive and process an authentication request message from another computing device, and generate and send an authentication response message to the other computing device.

Encryption module 312 may include any program, software, or other code suitable to perform operations related to encryption and/or decryption. For example encryption module may be configured to generate a shared secret, such as using a key agreement protocol such as Diffie-Hellman. Encryption module 312 may be further configured to derive a session key from a shared secret, such as using a key derivation function (KDF). In some embodiments, encryption module 312 may be configured to store one or more static keys, such as a static user device private key or a static server computer private key. In some embodiments, encryption module 312 may be implemented using any combination of software (such as host card emulation or HCE) and hardware (such as a hardware security module or HSM).

Application module 313 may include a payment application service operable to service payment applications at one or more computing devices. In some embodiments, the payment application service may be configured to allow a user to select goods and services to be purchased. The application module 313 may also include services for enrolling or re-enrolling user devices and/or conducting transactions with user devices.

It is understood that the components described herein are for illustration purposes only and not intended to be limiting. In various embodiments, more or less components than listed herein may be provided. For example, in an embodiment, the server computer 300 may not include a secure element 304 and/or an application module 313.

While the general term "server computer" is used, in some embodiments, different server computers may be provided to implement different features of the invention. For example, a provisioning server may be configured to establish shared secret(s) with a user device, and provision credentials including token, key derivation parameters, update parameters, cryptogram derivation parameters, transaction parameters, and any other suitable data to a user device. A registration server may be configured to provide a registration data to a user device, receive a registration cryptogram from the user device, and validate a registration cryptogram using the registration data provided by the user device. A validation server may be configured to validate transaction cryptograms provided by a user device using update shared secret that is determined based on a previous shared secret. A renewal server may be configured to establish a new shared secret may be established between the user and the server computer. Additionally, the renewal server may be configured to provision new parameters (e.g., new key derivation parameters, new cryptogram derivation parameters, and/or new update parameters) may be provisioned onto the user device to be used for generating cryptograms and/or cryptogram keys.

In various embodiments, the provisioning server, registration server, and validation server may be implemented by separate server computers or the same server computer. For instance, the validation server may be implemented by a transaction server configured to handle payment requests that is separate from the provisioning server and/or registration server. The provisioning server and the registration server may be the same server or separate servers. The registration server and the renewal server may be the same or separate servers. When implemented by separate server computers, the provisioning server, registration server, renewal server, and/or validation server may communicate with each other so as to access information required to decrypt and/or verify data (e.g., server private keys, shared secrets, key derivation parameters, cryptogram derivation parameters, update parameters, cryptograms, request data, etc.).

II. Credential Provisioning Methods

Embodiments can use the systems and apparatuses described above to provision data such as credentials from a server computer to a user device. FIGS. 4-7 describe some examples of such methods. In some embodiments, the user device may include the user device 101 or 200 of FIGS. 1 and 2, respectively. The server computer may include the device 102, 103, 104, 105, 106, or 300 of FIGS. 1 and 3, respectively. In some embodiments, the server computer can include a provisioning server computer.

The user device may transmit to server computer a request message generated using identification data. Typically, the identification data is encrypted or otherwise protected. In some embodiments, the request message may pass through an untrusted network. The server computer can process the request message to obtain and verify the identification data. The server computer can then encrypt payload data and transmit the encrypted payload data to the user device in a response message. The user device can then process the response message to obtain the payload data. The payload data can include payment credentials, such as PAN, cryptographic keys (e.g., encryption keys, LUKs, blinded public keys), key derivation parameters, certificate chain information, and the like.

The server computer can maintain a static server computer key pair including a static server computer public key and a static server computer private key. Similarly, the user device can maintain a static user device key pair including a static user device public key and a static user device private key. In addition, user device and/or server computer can generate an ephemeral key pair (i.e., an ephemeral user device key pair or an ephemeral server computer key pair, respectively). One or more of these keys can be used to encrypt or decrypt the request message and/or the response message.

In various embodiments, either or both the first and the server computers may be a part of any one of devices, networks, or devices 101-106. For example, in some embodiments, user device may be a user device 101, and server computer may be an access device 102, a merchant computer 103, an acquirer computer 104, a payment processing network computer 105, an issuer computer 106, or any other suitable device. In such embodiments, when a user conducts a transaction, the user device communicates with the server computer.

A. User Device

Figure 4:
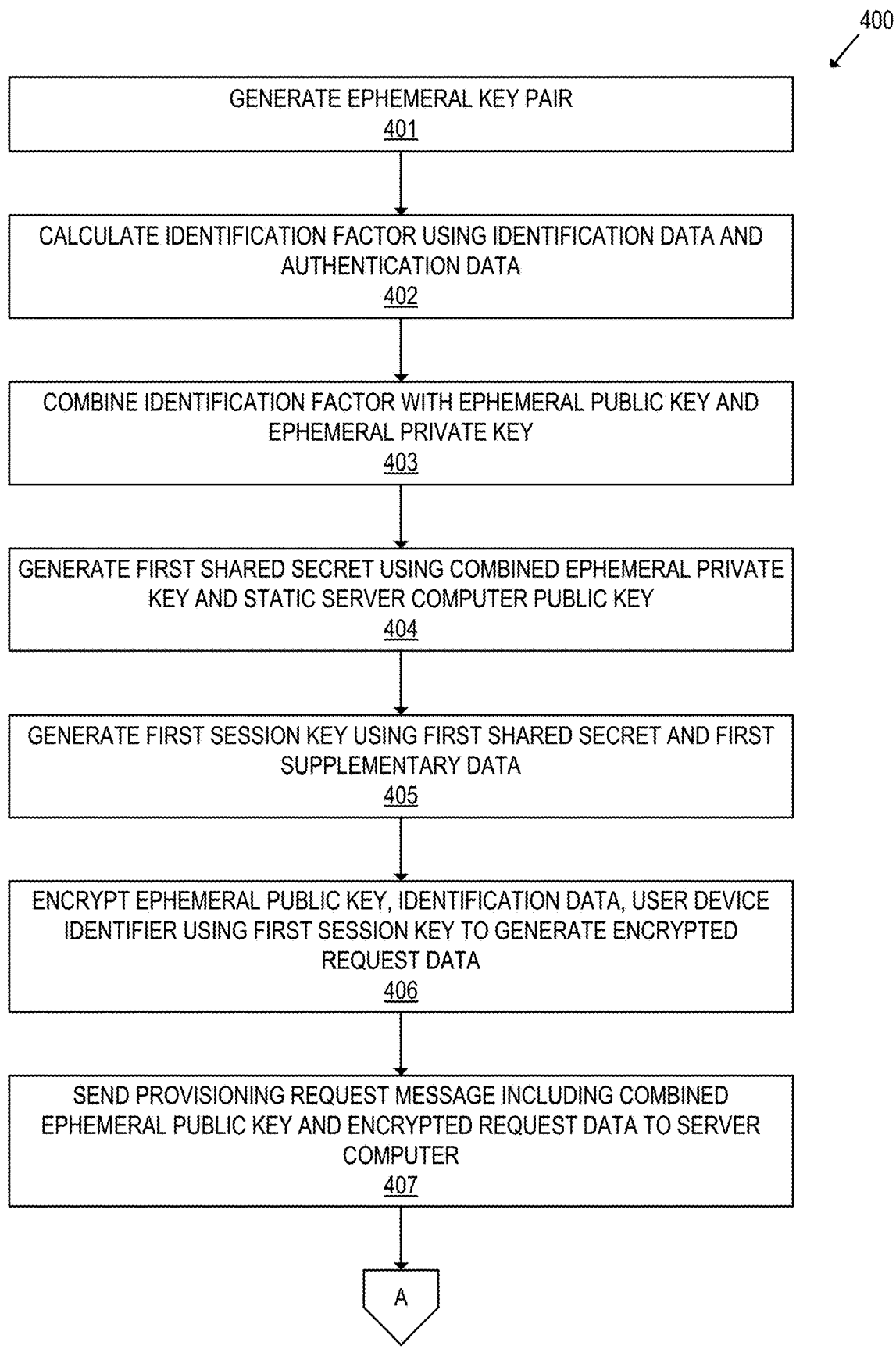
FIGS. 4-5 show an example process or method for securely authenticating to and/or obtaining response data from a server computer, in accordance with some embodiments.
Figure 5:
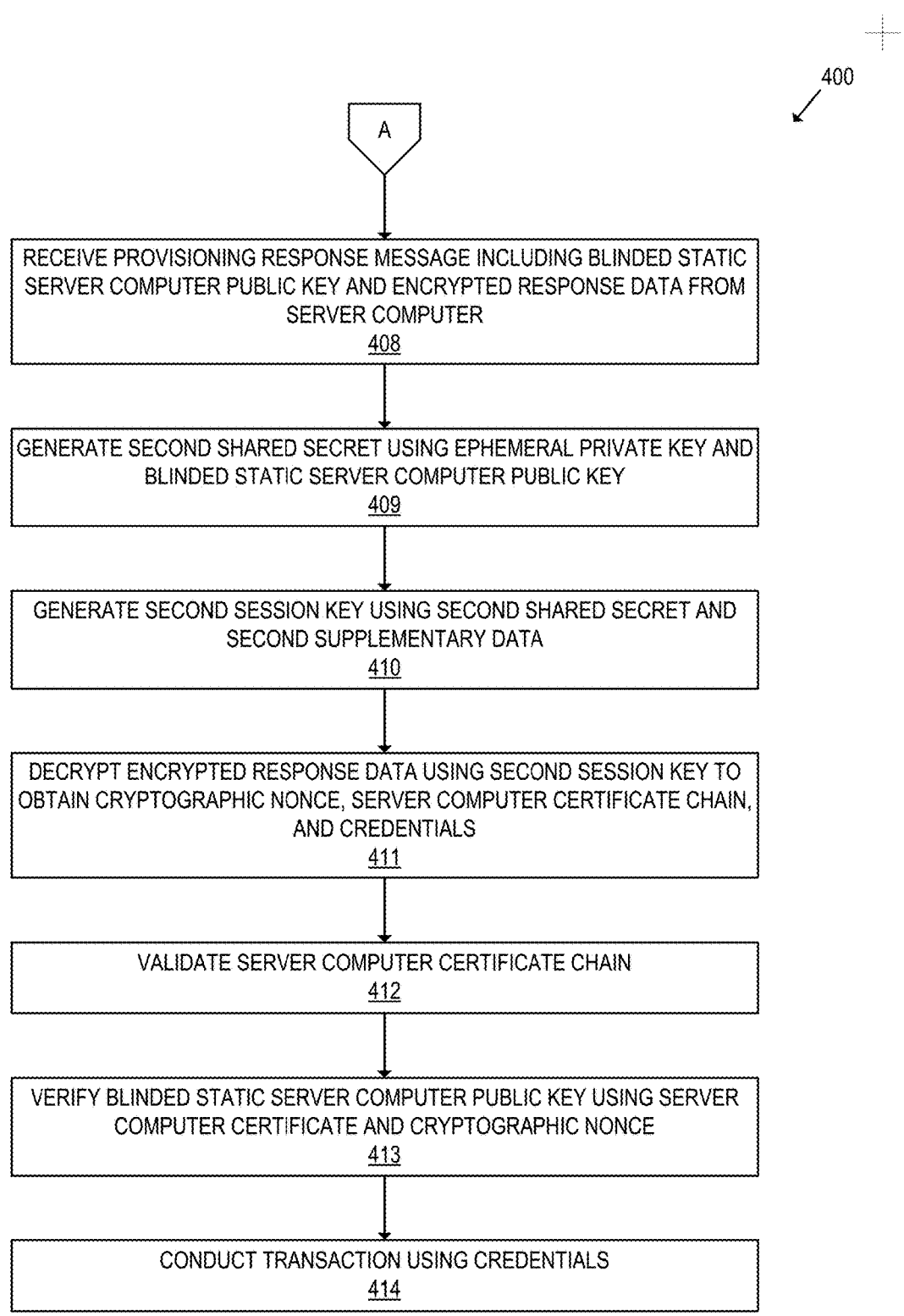

FIGS. 4-5 show an example process or method 400 for securely provisioning (e.g., credentials) from a server computer, in accordance with some embodiments. Aspects of the process 400 may be performed by a user device such as a user device 101 or 200. Alternatively or additionally, aspects of the process 400 may be performed by any other suitable entities. Some or all aspects of the process 400 (or any other processes described herein, or variations and/or combinations thereof) may be performed under the control of one or more computer/control systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program including a plurality of instructions executable by one or more processors. The computer-readable storage medium may be non-transitory. The order in which the operations are described is not intended to be construed as a limitation, and any number of the described operations may be combined in any order and/or in parallel to implement the processes.

At step 401, an ephemeral key pair is determined. An "ephemeral key pair" may include a public key (i.e., an "ephemeral public key") and a private key (i.e., an "ephemeral private key") generated for use with a single transaction or other communication session. The ephemeral key pair may be of any suitable format, such as ECC or RSA. Typically, the ephemeral key pair may be deleted once a communication session using the ephemeral key has ended, or once one or more shared secrets have been generated using the ephemeral key pair. Such removal of the ephemeral key pairs may reduce the risks of compromise.

At step 402, an identification factor is calculated using identification data and authentication data. Identification data may include any data or information associated with a user or a user device. Examples of identification data may include a name of a user associated with user device, an organization associated with user device, payment information such as a primary account number (PAN) or token associated with user device, an expiration date associated with the PAN or token, a certificate associated with user device, an IMEI or serial number of user device, etc. Authentication data may include any data or information suitable to authenticate a user or user device. Examples of authentication data may include a password or passphrase, a secret key (e.g., a private key), etc. An identification factor may include any data or information determined from identification data and/or authentication data. For example, in some embodiments, the identification factor may be generated by hashing a combination of the identification data and the authentication data.

At step 403, the identification factor is combined with the ephemeral public key and the ephemeral private key. As a result, a combined ephemeral public key and a combined ephemeral private key may be determined. A combined key may include a key that has been obfuscated or otherwise modified from its original value by combination with another data element or value. For example, the combined ephemeral public key may be a combination of the ephemeral public key and the identification factor. Similarly, the combined ephemeral private key may be a combination of the ephemeral private key and the identification factor. In some embodiments, combining a key with a data element may include performing a point multiplication of the key and the data element. In some embodiments, step 403 is optional.

At step 404, a first shared secret is generated using the combined ephemeral private key and a static server computer public key. The first shared secret can also be referred to as a request shared secret because it is used to protect (e.g., encrypt and/or decrypt) the request message as discussed below. The static server computer public key may include a static public key maintained by server computer, such as in a secure element. In some embodiments, the static server computer public key may be determined from a digital certificate of server computer, which may have been previously obtained by user device, and which may be signed by a trusted certificate authority.

The shared secret may be generated from the combined ephemeral private key and the static server computer public key using any suitable method. For example, in embodiments using elliptic curve cryptography, the shared secret may be determined using the elliptic-curve Diffie-Hellman protocol (ECDH).

At step 405, a first session key is generated using the first shared secret and first supplementary data. The first supplementary data may include any other data used to generate the first session key. Examples of first supplementary data may include a server computer identifier and/or a truncated ephemeral public key.

The session key may be of any suitable format (e.g., AES, DES, Blowfish, etc.), of any suitable length, and generated using any suitable key derivation function (KDF). For example, in one embodiment, the session key may be generated using the Password-Based Key Derivation Function 2 (PBKDF2) algorithm. In some embodiments, other data, such as a user device identifier, may be used as additional inputs to the key derivation function.

At step 406, the ephemeral public key, the identification data, and a user device identifier are encrypted using the first session key to generate encrypted request data. The first session key can also be referred to as a message protection key. A "user device identifier" may include any identifier suitable to identify a user device.

In some embodiments, the request data can include device or user identifier and/or authenticator information (e.g., authenticator identifier). The request data can also include client configuration information and/or directives for the service. In some examples, such information can be provided by user devices that do not a priori include means for strong authentication.

At step 407, a provisioning request message including the combined ephemeral public key and the encrypted request data is sent to server computer. In some embodiments, the provisioning request message may pass through one or more intermediaries (e.g., untrusted network) before reaching server computer. The provisioning request message may include the ephemeral public key and not include the encrypted request data.

Continuing at step 408 of FIG. 5, a provisioning response message including a blinded static server computer public key and encrypted response data is received from server computer. Typically, the blinded static server computer public key may be a blinded form of the static server computer public key used at step 404 to generate the first shared secret. In such embodiments, the first shared secret is different from the second shared secret discussed below. In some other embodiments, the static server computer public key received from the server computer may not be blinded. In such embodiments, the second shared secret is substantially the same as the first shared secret. Where the static server computer public key is not blinded, a cryptographic nonce may be provided as part of the response data and used to compute cryptograms. For instance, the cryptographic nonce from the server (entropy) can be used or stored for further derivation or a second cryptographic nonce can be provided as part of the derivation parameters. It is essential that entropy from the server is used in the computation of the cryptograms (e.g., payment transaction cryptograms).

At step 409, a second shared secret is determined using the ephemeral private key and a static server public key. In some cases, the second shared secret can be referred to as the response shared secret because it is used to (e.g., encrypt and/or decrypt) the response message as discussed below. In some embodiments, a blinded static server computer public key is received from server computer at step 408. In some other embodiments, a blinded key is derived from the static server public key at the user device. The blinded key may be derived using a cryptographic nonce that may be provided as part of the provisioning response message. The cryptographic nonce can be a random number. The cryptographic nonce can also be used to verify a server computer certificate, as discussed elsewhere.

In some embodiments, the second shared secret may be generated from the ephemeral private key and the blinded static server computer public key using any suitable method, such as ECDH. In other embodiments, the second shared secret may be determined without a blinded key. In such embodiments, provisioning response message (e.g., the credentials) may include a cryptographic nonce that can be used to derive a cryptogram key.

At step 410, a second session key is generated using the second shared secret and second supplementary data. The second supplementary data may include any other data used to generate the second session key. Examples of second supplementary data may include a server computer identifier, a user device identifier, and/or a truncated ephemeral public key. The second session key may be generated using any suitable KDF.

At step 411, the encrypted response data is decrypted using the second session key to obtain a cryptographic nonce, a server computer certificate chain, and payload data. The server computer certificate chain may include a chain of one or more signed certificates from a root CA certificate to a server computer certificate, whereby the chain establishes the authenticity of the server computer certificate. The payload data may include any suitable data. For example, the payload data may include non-credential information such as a confirmation of a transaction, a user's account balance, and the like, and credentials such as payment credentials. The payload data or payment credentials can include any one or more of: a PAN or a token (e.g., PAN substitute), a limited use key (LUK) that can be used to conduct future transactions, and other key derivation parameters that may be used to derive cryptogram keys, update parameters, transaction parameters, and the like. Some or all portions of the response data may be encrypted using one or more encryption keys.

The payload data or credentials may include key derivation parameters that may or may not include a limited use key (LUK). The key derivation parameters (which may or may not include the LUK) may be used to generate one or more cryptograms for conducting transactions. For instance, the LUK may be used to derive a cryptogram directly or used to derive a cryptogram key that is then used to generate a cryptogram.

The payload data or credentials may also include update parameters that may be used by the user device to generate an updated shared secret based on a previous shared secret. In some embodiments, the key derivation parameters may be substantially the same as the update parameters. In some other embodiments, the key derivation parameters may be different than the update parameters. The key derivation parameters and/or the update parameters may be unique per user device or per group of user devices so as to prevent mass offline attacks.

The payload data or credentials may include cryptogram derivation parameters may be used to derive cryptograms.

The key derivation parameters, the cryptogram derivation parameters, and/or the update parameters may include a LUK, a specification of which transaction parameters from a given transaction to use, code for performing the derivation (or an identifier of which derivation procedure to use) and/or other information related to these parameters. In some embodiments, the key derivation parameters, cryptogram derivation parameters, and/or the update parameters may include "dummy" or invalid parameters for obfuscation purposes. The code can be personalized derivation method code in that it is unique to a device or group of devices, and may be assigned randomly. The code can be signed by the server or other vendor, so that the user device can authenticate the code. In some embodiments, the code is obfuscated before being signed, thus making it difficult for an attacker to understand, bypass, and/or reverse engineer the code.

At step 412, the server computer certificate chain is validated. The server computer certificate chain may be validated using any suitable online or offline method. For example, for each of the one or more certificates in the chain, the digital signature of the certificate can be validated using a known trusted public key (e.g., a certificate authority's public key, or a public key of an entity appropriately authorized by the CA). For example, in some embodiments, a digital signature algorithm, such as the elliptic curve digital signature algorithm (ECDSA) may be used to validate a certificate. In some embodiments, a server computer certificate may be verified using a cryptographic nonce that is provided as part of the provisioning response message (e.g., as part of the credentials).

At step 413, the blinded static server computer public key is verified using the server computer certificate and the cryptographic nonce. Verifying the blinded static server computer public key may include ensuring that the blinded static server computer public key matches an expected value. For example, in some cases, a second blinded static server computer public key may be generated using the static server computer public key included on the server computer certificate, and the cryptographic nonce decrypted at step 411. The second blinded static server computer public key may then be compared to the blinded static server computer public key received at step 408 to ensure that the keys match. Alternatively, in some cases, the blinded static server computer public key received at step 408 may be verified by comparing it to a stored blinded static server computer public key. If the keys match, server computer may be authenticated. Otherwise, authentication may fail.

It should be noted that this method of authentication (i.e., verifying a blinded static public key) can provide the advantage that the static server computer public key, which may be considered sensitive (as it may reveal the identity of the server computer), does not need to be transmitted in clear text. Thus, authentication of server computer can be performed while protecting the identity of server computer from an eavesdropper that captures the provisioning request message.

At step 414, a transaction is conducted using the payload data. In some embodiments, the payload data may include credentials (e.g., token, key derivation parameters, update parameters, cryptogram derivation parameters). In such embodiments, a transaction can be conducted using the credentials. For example, a cryptogram key can be generated from the second (response) shared secret using the key derivation parameters provided. The cryptogram key can be further derived using a cryptographic nonce that may be provided as part of the payload data. The cryptogram key can be operable to generate a cryptogram. The cryptogram can also be generated using the cryptogram derivation parameters provided as part of the payload data. The cryptogram can be used in a secure communication with a validation server computer. The cryptogram can be included in an authorization request message and verified by the validation server computer.

In some embodiments, the second (response) shared secret may be updated to determine an updated shared secret using update parameters, the credentials including the update parameters. A second cryptogram key may be determined using the updated shared secret and the key derivation parameters. A second cryptogram can be generated using the second cryptogram key. A second secure communication can be conducted with the validation server computer using the second cryptogram.

In some embodiments, the second secure communication can be an authorization transaction, wherein the second cryptogram authenticates at least one element of the authorization transaction.

In some embodiments, new shared secrets may be generated for each of a plurality of new secure communications, each new shared secret generated using a previous shared secret and the update parameters. New cryptogram keys can be derived using the new shared secrets and the key derivation parameters. New cryptograms can be generated using the new cryptogram key. New secure communications can be conducted the validation server computer using the new cryptograms.

In some embodiments, the user device may be configured to store only the response (second) shared secret without storing the first (request) shared secret to reduce the risk of exposure. In some cases, the first shared secret is no longer needed once the request is sent. The response shared secret may be stored in order to generate updated shared secret for subsequent transactions. In some embodiments, the user device may be configured to store only the latest one or more shared secrets (e.g., the last shared secret or the last few shared secrets) to reduce damage of potential compromise. Other data from the response data can also be stored such as key derivation parameters, update parameters, cryptogram derivation parameters, cryptographic nonce, and the like.

B. Server Computer

Figure 6:
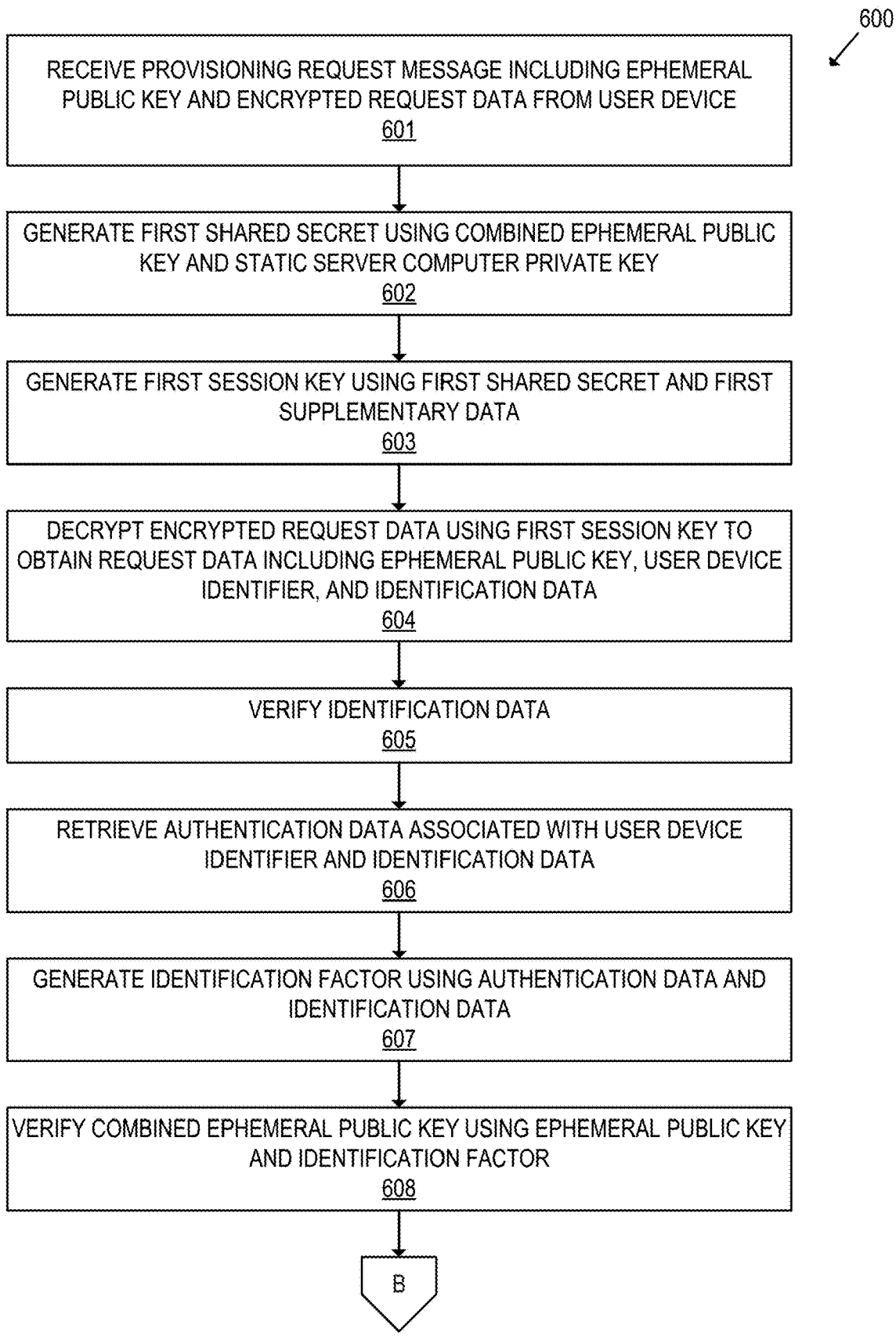
FIGS. 6-7 show an example process or method for securely processing a provisioning request message from a user device and providing a provisioning response message to the user device, in accordance with some embodiments.
Figure 7:
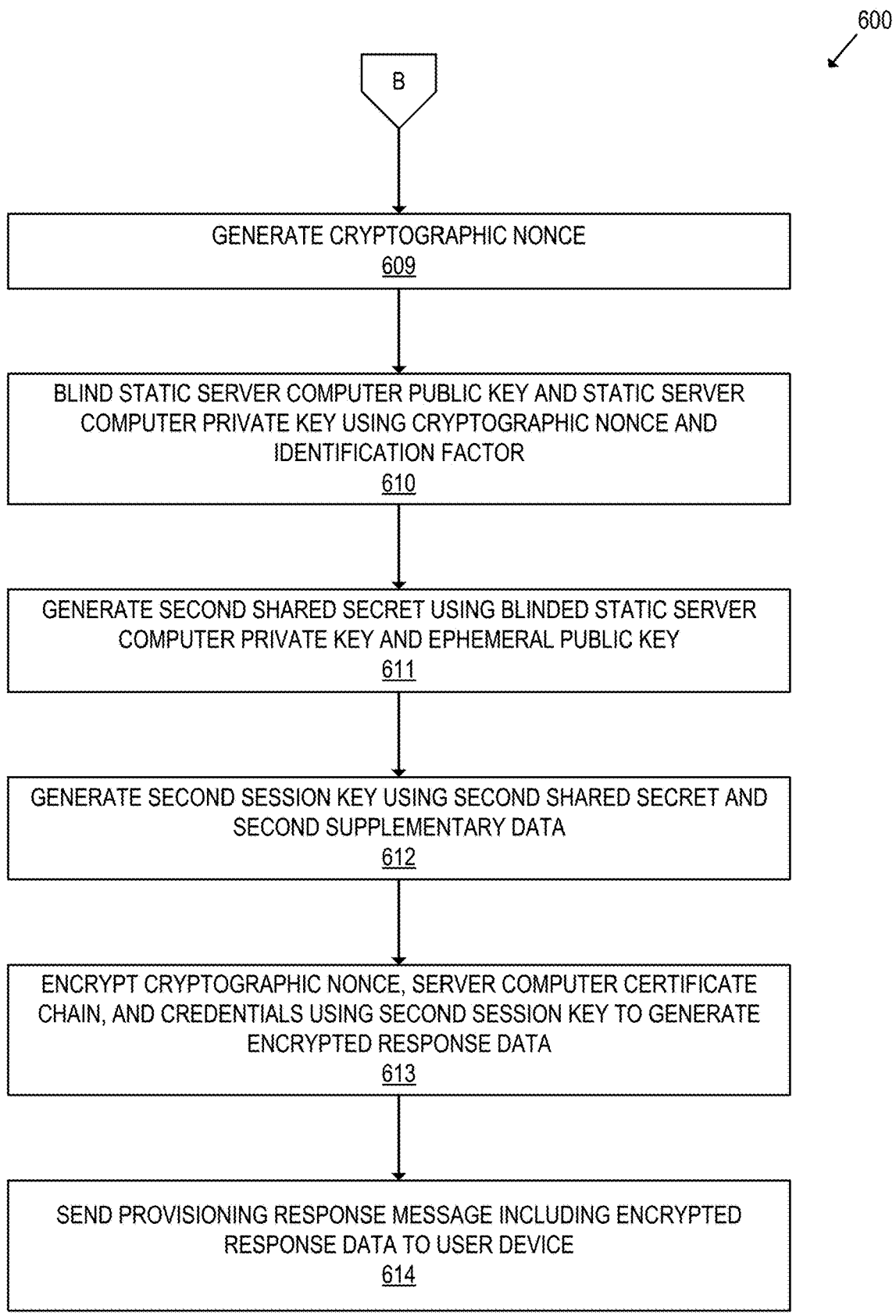

FIGS. 6-7 show an example process or method 600 for securely provisioning data (e.g., credentials) to a user device, in accordance with some embodiments. Aspects of the process 600 may be performed by a server computer such as a server device or computer 102, 103, 104, 105, 106, or 300. For instance, the process 600 may be performed by a provisioning server. Alternatively or additionally, aspects of the process 600 may be performed by any other suitable entities.

Typically, before method 600, server computer maintains a static server computer key pair. The static server computer key pair may include a public key (i.e., a "static server computer public key") and a private key (i.e., a "static server computer private key"). Server computer may also include a "server computer certificate" including the static server computer public key. The server computer certificate may be signed by a certificate authority, such as payment processing network 105 or issuer computer 106.

At step 601, a provisioning request message including a combined ephemeral public key and encrypted request data is received from user device. Typically, the combined ephemeral public key may be generated by user device using an ephemeral public key and an identification factor (e.g., in accordance with step 403 of method 400). The combined ephemeral key may be just the ephemeral public key, without any use of an identification factor. The provisioning request message may include ephemeral public key, and not the encrypted request data. In such implementations, certain steps below may not be needed, as will be understood by one skilled in the art.

At step 602, a first (request) shared secret is generated using the combined ephemeral public key received at step 601 and a static server computer private key. The shared secret may be generated from the combined ephemeral public key and the static server computer private key using any suitable method, such as ECDH.

At step 603, a first session key is generated using the first shared secret and first supplementary data. The first supplementary data may include any other data used to generate the first session key. Typically, the same data used to generate the first session key at the user device (e.g., in accordance with step 405 of method 400) may be used at step 603.

At step 604, the encrypted request data is decrypted using the first session key to obtain request data including an ephemeral public key, a user device identifier, and identification data. The ephemeral public key may correspond to the combined ephemeral public key received at step 601. The user device identifier may include any data suitable to identify user device. Identification data may include any data or information associated with a user or user device. Examples of identification data may include a name of a user associated with user device, an organization associated with user device, payment information such as a primary account number (PAN) or token associated with user device, an expiration date associated with the PAN or token, a certificate associated with user device, an IMEI or serial number of user device, etc.

At step 605, the identification data is verified using the user device identifier. For example, in some embodiments, the user device identifier may be used to retrieve corresponding identification data from a device database. The decrypted identification data can then be verified by comparison to the received identification data.

At step 606, authentication data associated with the user device identifier and/or the identification data is retrieved. Authentication data may include any data or information suitable to authenticate a user or user device. Examples of authentication data may include a password or passphrase, a secret key (e.g., a private key), etc. In some embodiments, the authentication data can be retrieved from a device database.

At step 607, an identification factor is generated using the retrieved authentication data and the identification data. An identification factor may include any data or information determined from identification data and/or authentication data. For example, in some embodiments, the identification factor may be generated by hashing a combination of the identification data and the authentication data. Typically, the identification factor generated at step 607 is performed in the same manner as at user device (e.g., in accordance with step 402).

At step 608, the combined ephemeral public key is verified using the ephemeral public key and the identification factor. Verifying the combined ephemeral public key may include ensuring that the combined ephemeral public key matches an expected value. For example, in some cases, a second combined ephemeral public key may be generated using the ephemeral public key obtained at step 604, and the identification factor determined at step 607. The second combined ephemeral public key may then be compared to the combined ephemeral public key received at step 601 to ensure that the keys match. If the keys match, user device may be authenticated. Otherwise, authentication may fail.

It should be noted that this method of authentication (i.e., verifying a combined ephemeral key) provides the advantage that authentication data, which may be sensitive, does not need to be transmitted in plaintext, even in encrypted form. Thus, even if the static server computer private key is later compromised (however unlikely), the plaintext authentication data is not exposed. Furthermore, since blinding of a key is typically irreversible, an attacker cannot derive the identification factor, let alone the authentication data used to generate the identification factor, even with knowledge of both the combined ephemeral public key and the ephemeral public key.

Continuing at step 609 of FIG. 7, a cryptographic nonce is generated. The cryptographic nonce may be a random or pseudo-random data value generated using any suitable method.

At step 610, the static server computer public key and the static server computer private key are blinded using the cryptographic nonce and the identification factor. As a result, a blinded static server computer public key and/or a blinded static server computer private key may be determined. A blinded key may include a key that has been obfuscated or otherwise modified from its original value by combination with one or more other data elements. For example, the combined ephemeral public key may be a combination (e.g., a point multiplication) of the ephemeral public key, the cryptographic nonce, and the identification factor. Similarly, a combined ephemeral private key may be a combination of the ephemeral private key, the cryptographic nonce, and the identification factor.

At step 611, a second shared secret is generated using the blinded static server computer private key and the ephemeral public key. In an alternative embodiment, the static server computer private key is not blinded. Instead, the ephemeral public key is blinded. The shared secret may be generated from the combined ephemeral public key and the static server computer private key using any suitable method, such as ECDH.

At step 612, a second session key is generated using the second shared secret and second supplementary data. The second supplementary data may include any other data used to generate the second session key. Typically, the same data used to generate the second session key at the user device (e.g., in accordance with step 410 of method 400) may be used at step 612.

At step 613, the cryptographic nonce, a server computer certificate chain, and other credentials of a payload are encrypted using the second session key to generate encrypted response data. The server computer certificate chain may include a chain of one or more signed certificates from a root CA certificate to a server computer certificate, whereby the chain establishes the authenticity of the server computer certificate. The payload data may include any suitable data. For example, the payload data may include a confirmation of a transaction, a user's account balance, a limited use key (LUK) that can be used to conduct future transactions, etc. The payload data can also include key derivation parameters, cryptogram derivation parameters, update parameters. The key derivation parameters, cryptogram derivation parameters, and/or the update parameters may include a LUK, a specification of which transaction parameters from a given transaction to use, code for performing the derivation (or an identifier of which derivation procedure to use) and/or other information related to these parameters. The code can be personalized derivation method code in that it is unique to a device or group of devices, and may be assigned randomly. The code can be signed by the server or other vendor, so that the user device can authenticate the code.

In some embodiments, the community of users of the code is into smaller groups. Each group can receive different code, where, each release of the code (e.g., released annually) can be different. Advantageously, an attack that succeeds in reverse engineering one of the user device does not impact any user devices not in the same group. The randomization process in providing both the code and the key/cryptogram derivation parameters can make the compromised group smaller and changing, thereby making the process less attractive to the hackers.

At step 614, a provisioning response message including the encrypted response data is sent to user device. In some embodiments, the response message can also include a static server computer public key which may or may not be blinded. The provisioning response message may pass through one or more intermediaries (e.g., untrusted network) before reaching user device.

III. Enrollment Methods

Embodiments of the invention introduce efficient methods for securely provisioning a device with sensitive data (e.g., a limited use key (LUK) and/or other credential data) onto a user device so the device can perform secure communications. Enrollment process can optionally include a provisioning process where credentials, parameters (e.g., key derivation parameters, update parameters, cryptogram derivation parameters), and any other suitable data is provisioned from the server computer to the user device. Optionally, the enrollment process can also include a registration process where a user device uses the provisioned material to generate a registration cryptogram which is then validated by the server computer.

For example, in one embodiment, a user device can generate an ephemeral key pair including an ephemeral public key and an ephemeral private key. The user device can derive a first session key using the ephemeral private key and a server computer public key, and use the first session key to encrypt an authentication factor (such as user credentials). The user device can then send a request message including the encrypted authentication factor and the ephemeral public key to a server computer (e.g., a payment processing network computer).

Upon receipt of the request message, the server computer may regenerate the first session key using the received ephemeral public key and a server computer private key. The server computer can then decrypt the encrypted authentication factor and authenticate the user device. If the user device is successfully authenticated, the server computer can generate a second session key, key derivation parameters, and potentially an LUK. The server computer may encrypt the response data including the key derivation parameters which may or may not include the LUK using the second session key to generate an encrypted payload. The server computer can then send a response message to the user device including the encrypted payload.

In response, the user device can decrypt the encrypted payload to determine the key derivation parameters which may or may not include the LUK. The key derivation parameters can be used to generate cryptogram keys which may in turn be used to generate cryptograms for conducting transactions.

In addition, some embodiments can provision key derivation parameters (which may or may not include a LUK) onto a previously unauthenticated user device using only two messages: a request message from a user device, and a response message to the user device. Thus, embodiments can provide the above benefits while reducing both the time and the processing needed to provision the user device.

A. User Device

Figure 8:
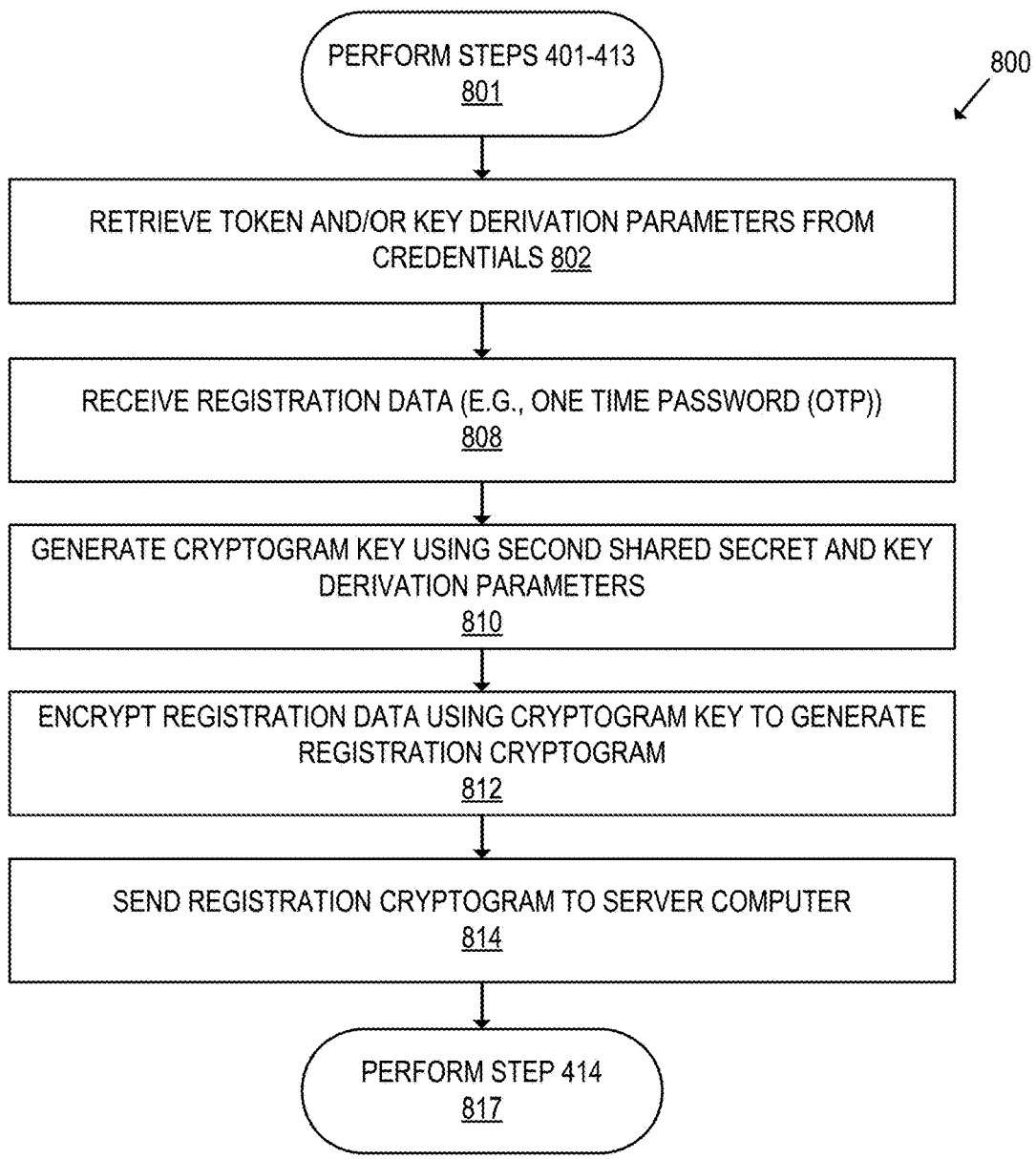
FIG. 8 shows an example enrollment process or method for provisioning a user device with a limited use key generated by a server computer, in accordance with some embodiments.

FIG. 8 shows an example enrollment process or method 800 for provisioning a user device (e.g., user device 101) with a limited use key generated by a server computer (e.g., payment processing network computer 105), in accordance with some embodiments. Aspects of the process 800 can be performed by the user device 101 or 200 of FIGS. 1 and 2, respectively. The server computer can include a provisioning server and/or a registration server.

At step 801, steps 401-413 of method 400 can be performed. In particular, the user device can determine an ephemeral key pair including an ephemeral public key and an ephemeral private key. The user device can derive a first session key using the ephemeral private key and a server computer public key, and use the first session key to encrypt an authentication factor (such as user credentials). The user device can then send a provisioning request message including the encrypted authentication factor and the ephemeral public key to a server computer. The provisioning request message can also function as a LUK request message. A provisioning/LUK response message may be received from the server computer in response. The response message can include blinded server computer public key and encrypted response data. The user device can generate a second shared secret using the ephemeral private key and the blinded server computer public key. The user device can also generate a second session key using the second shared secret and second supplementary data such as a server computer identifier, a user device identifier, and/or a truncated ephemeral public key. The encrypted response data can be decrypted using the second session key to obtain a cryptographic nonce, a server computer certificate chain, and payload data. The server computer certificate chain and the blinded server computer public key can be verified or validated. Further description of these steps can be found with reference to the corresponding steps in method 400.

At step 802, key derivation parameters can be obtained from the credentials. The key derivation parameters can optionally include a limited use key (LUK). As discussed at step 411 of method 400, the response data from the server computer can include payload data encrypted using the second session key derived from the second shared secret. The payload data can be retrieved by decrypting the response data using the second session key derived above from the second secret. The payload data may include, among other data, credentials that can include the token, key derivation parameters, update parameters, cryptogram derivation parameters, and the like.

At step 808, registration data (e.g., one-time password (OTP)) can be received, for example, from a server computer. The server computer may be a registration server that may or may not be the same as the provisioning server discussed above. The registration data may be transmitted to the user device using a separate communication channel than the communication channel used to transmit the provisioning request/response messages. For example, the registration may be transmitted over SMS, email, phone call, online chat, facsimile, postal mail, and the like, and entered manually into user device by a user. In some other embodiments, the registration data may be provided in the same communication channel as the provisioning request/response messages. In such embodiments, the registration data may be provided in the provisioning response message or in a different message.

In various embodiments, registration data can include other data instead of or in addition to an OTP. For example, the registration data can include non-password data such as static string, unique device or user identifier, dummy transaction data, and the like. Any other registration data can be used as long as it is verifiable.

At step 810, a cryptogram key can be generated using the second (response) shared secret and/or the key derivation parameters. In some embodiments, the key derivation parameters may optionally include a limited use key (LUK). The second (response) shared secret can be generated, for example, at step 409 of the provisioning process illustrated in FIG. 5. The cryptogram key can be generated using some or all of the second shared secret, the LUK, and/or the key derivation parameters. For example, the cryptogram key may be generated using only the LUK alone, the second shared secret alone (e.g., using the second session key derived from the second shared secret), or the key derivation parameters alone. For example, the cryptogram key can be the LUK or the second session key. In some other embodiments, the cryptogram key can be generated using the LUK and the second shared secret, the LUK and the key derivation parameters, or the second shared secret and the key derivation parameters. For instance, the cryptogram key can be generated using a combination of the LUK and the second session key. In yet some other embodiments, the cryptogram key can be generated using the second shared secret, the LUK, and the key derivation parameters. The LUK can be considered a derivation parameter.

In some embodiments, a list of algorithms (e.g., key derivation algorithms or functions) and parameters (e.g., key derivation parameters and/or update parameters) discussed herein can be unique to a specific device or a specific group of devices so as to prevent reverse engineering. The variation from device to device may be based on the software development kit (SDK) installed on the device. In some embodiments, the exact algorithm and/or parameters used for deriving a particular key or a shared secret can be identified using a bitmap stored on the device. The interpretation of the bitmap and the mapping of the bitmap to the actual list of algorithms and/or parameters can vary by the device-specific SDK. For example, on one device, the list of algorithms stored may be {alg1, alg2, . . . , alg8}, while on another device, the list of algorithms stored can be {alg3, alg5, . . . , alg1}. Similarly, the lists of key derivation parameters and/or update parameters can also be stored in differently on different devices. In some embodiments, the algorithms and/or parameters may be listed in a random fashion on some or all of the devices. The bitmap may point to the right index in the list of algorithms and/or parameters to be used for the actual key generation. In some embodiments, the response data provided by a server computer can include a bitmap that points to proper algorithms and/or parameters to be used by a user device to generate keys and/or shared secrets. In some cases, the bitmap provided by the server computer may be generated specifically for a given user device based on the order in which the algorithms and/or parameters are stored on the user device.

In some embodiments, some or all of the key materials such as shared secrets, session keys, and the like, may be destroyed or otherwise rendered inaccessible (e.g., encrypted) after the response message is processed or after a transaction or session has ended. For example, in some embodiments, only the latest (e.g., second) shared secret is retained while some or all previous (e.g., first) shared secrets are deleted from the user device. In some embodiments, the response shared secret or any other confidential information may be securely stored at the user device by leveraging hardware protection (e.g., using a secure element) or a white box cryptographic module on the user device.

In some embodiments, data that is stored on a user device includes the last shared secret (response shared secret) and any last parameters (e.g., key derivation parameters, update parameters, cryptogram parameters, transaction parameters) that are used to derive the next shared secret, the next cryptogram key (e.g., a LUK or SUK), the next cryptogram, and the like. Data stored on a user device can also include derivation parameters that were part of credential data in the server response and/or updated values upon each offline transactions including new shared secret(s), new transaction data, and the like. In some embodiments, updated values upon renewal responses can also be stored including new shared secret or parameters (e.g., key derivation parameters, cryptogram parameters, update parameters, transaction parameters, and the like).

At step 812, the received registration data (e.g., OTP) can be encrypted using the cryptogram key to generate a registration cryptogram (RC). Additionally or alternatively, the registration cryptogram may be generated using other data such as identification data, authentication data, other information extracted from the credentials and/or the response message, and the like. In an example, the registration cryptogram is generated by encrypting both the OTP and a secure element identifier of the user device (e.g., a subscriber identification module (SIM) ID). In some embodiments, a limited use key (LUK) is obtained from credentials previously received (e.g., at step 408 of method 400). The LUK may be used to generate the cryptogram key. In some embodiments, generating the cryptogram key also uses key derivation parameters included in the credentials.

In some embodiments, the registration data (e.g., one time password) is entered into an electronic wallet account set up on the user device. The encrypted registration data (e.g., registration cryptogram) may be associated with the account and stored on the user device.

At step 814, registration cryptogram can be sent to the server computer (e.g., registration server) for verification. In some embodiments, sending the registration cryptogram to the server computer includes encrypting the registration cryptogram using the second (response) shared secret. The server computer authenticates the user device using the registration cryptogram. Prior to sending the registration cryptogram, the registration cryptogram may be encrypted using the second session key or another key (e.g., the LUK, a public key of the server computer, or a shared secret key).

At step 817, step 414 of method 400 can be performed. Specifically, the credentials can be used to conduct payment transactions. For example, a payment token, the LUK and/or the key derivation parameters included in the credentials may be used to generate, directly or indirectly, transaction cryptograms used to authenticate future transactions, such as discussed in FIGS. 12-15.

B. Server Computer

Figure 9:
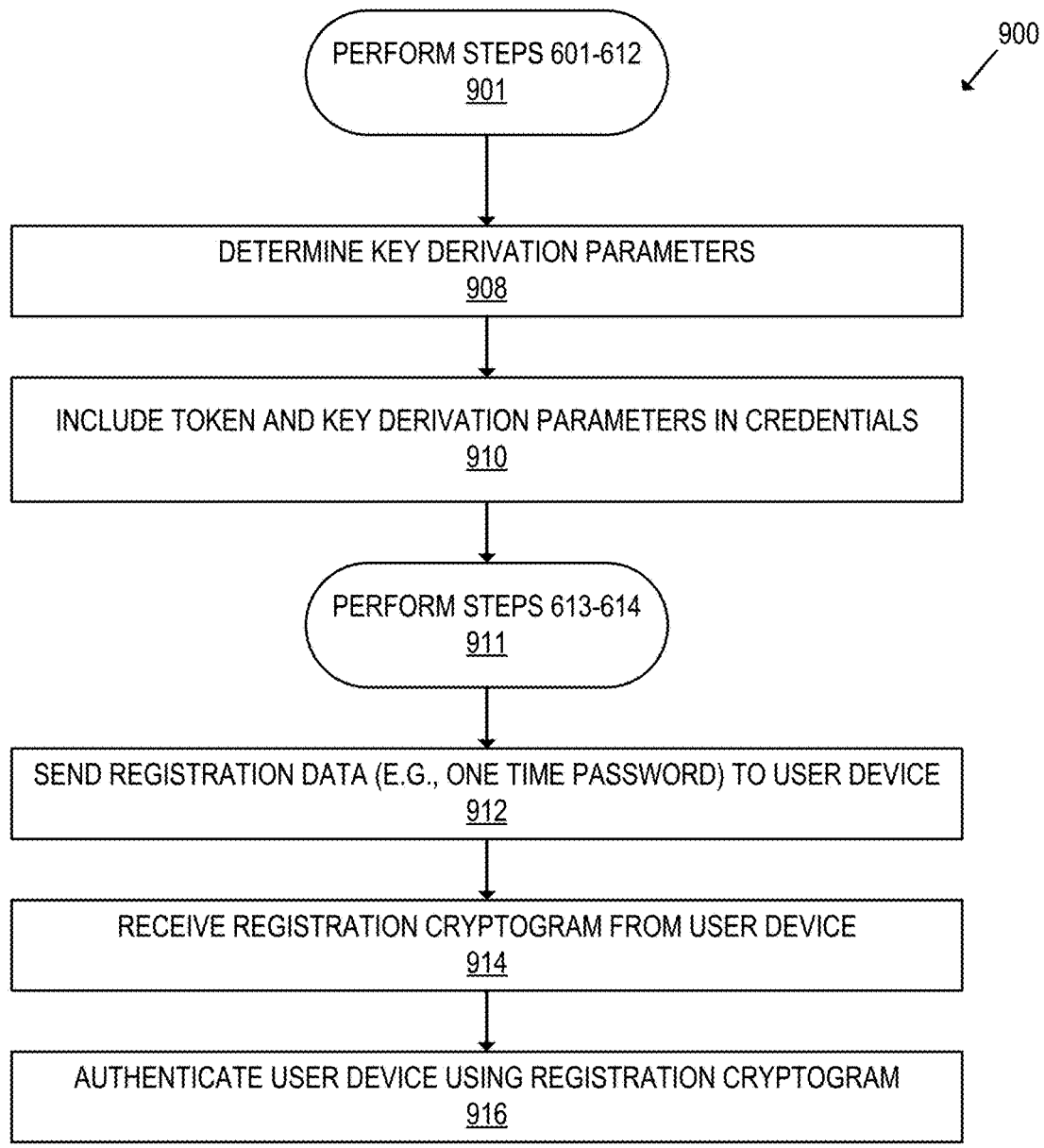
FIG. 9 shows an example enrollment process or method for provisioning a user device with a limited use key generated by a server computer, in accordance with some embodiments.

FIG. 9 shows an example enrollment process or method 900 for provisioning a user device (e.g., user device 101) with sensitive data such as a limited use key generated by a server computer (e.g., payment processing network computer 105), in accordance with some embodiments. Aspects of the process 900 can be performed by any of the server devices 102-106 or 300 of FIGS. 1 and 3, respectively. For instance, the process 900 may be performed by a provisioning server and/or a registration server discussed herein. In an embodiment, steps 901-911 are performed by a provisioning server and steps 912-916 are performed by a registration server. In an embodiment, the provisioning server is the registration server.

At step 901, steps 601-612 of method 600 can be performed. In particular, a provisioning request message can be received including combined ephemeral public key and encrypted request data from user device. A first shared secret can be generated using the combined ephemeral public key and static server computer private key. A first session key can be generated using the first shared secret and first supplementary data. The encrypted request data can be decrypted using the first session key to obtain request data including an ephemeral public key, a user device identifier, and identification data. The identification data can be verified. Authentication data associated with the user device identifier and the identification data can be retrieved. Identification factor can be generated using the authentication data and the identification data. The combined ephemeral public key can be verified using the ephemeral public key and the identification factor. A cryptographic nonce can be generated. The static server computer public key and/or the static server computer private key can be blinded using the cryptographic nonce and the identification factor. A second shared secret can be generated using the blinded static server computer private key and the ephemeral public key of the user device. Alternatively, the second shared secret can be generated using the static server computer private key and blinded ephemeral public key of the user device. A second session key can be generated using the second shared secret and the second supplementary data. Further description of these steps can be found with reference to the corresponding steps in method 600.

At step 908, key derivation parameters can be determined. The key derivation parameters can be used with key derivation functions (KDFs) to generate or derive keys such as the cryptogram key, the second session key, and the like. In some embodiments, the key derivation parameters can include instructions on how to obtain other key derivation parameters. In some embodiments, the key derivation parameters can include a LUK that can be used to derive other keys.

In some embodiments, a limited use key (LUK) can be optionally determined. In some embodiments, the LUK may be generated based on a shared secret (e.g., the first shared secret or the second shared secret) and/or a key derivation function (KDF). In some embodiments, the server computer may maintain a database indicating the Master Derivation Key (MDK) for a PAN/TOKEN range and determining the LUK includes deriving the LUK based on the MDK and the PAN/TOKEN from the payment transaction or from the registration request.

At step 910, key derivation parameters (which may include the LUK) can be included in the credentials. In some embodiments, other credentials may be included include cryptogram derivation parameters, update parameters, and any other suitable data.

At step 911, steps 613 and 614 of method 600 can be performed. Specifically, the cryptographic nonce, server computer certificate chain, and the credentials can be encrypted using the second key to generate encrypted response data. A provisioning response message including the blinded static server computer public key and the encrypted response data can be sent to user device. In some embodiments, the provisioning response message may pass through one or more intermediaries (e.g., an untrusted network) before reaching user device.

In some embodiments, key materials such as shared secrets, session keys, and the like, may be destroyed or otherwise rendered inaccessible (e.g., encrypted) at the server computer and/or user device when they are no longer needed locally. Preferably, the destruction occurs immediately or soon after the key materials become unnecessary. For example, the first shared secret can be removed from the user device immediately the request message is sent. As another example, the first shared secret can be removed from the server computer soon after request message from user device is processed.

At step 912, registration data (e.g., one-time password (OTP)) can be provided to a user device. The server computer may be a registration server that may or may not be the same as the provisioning server discussed above. The registration data may be transmitted to the user device using a separate communication channel than the communication channel used to transmit the provisioning request/response messages. For example, the registration may be transmitted over SMS, email, phone call, online chat, facsimile, postal mail, and the like, and entered manually into user device by a user. In some other embodiments, the registration data may be provided in the same communication channel as the provisioning request/response messages. In such embodiments, the registration data may be provided in the provisioning response message or in a different message.

At step 914, a registration cryptogram can be received from the user device. The registration cryptogram can be provided by the user device in the same communication channel as the provisioning request/request messages, or in a separate communication channel such as SMS, email, phone call, online chat, facsimile, postal mail, and the like.

At step 916, the user device can be authenticated using the registration cryptogram. In an example, a cryptogram key can be generated using the second shared secret, and the key derivation parameters. The cryptogram key can be used to encrypt the registration data that is provided to the user device. The resulting encrypted registration data may be compared against the received registration cryptogram to determine if there is a match. If there is a match, the user device may be authenticated. In some embodiments, additional authentication steps may be performed. If there is not a match, the user device is not authenticated. In some embodiments, validating the registration cryptogram may include comparing the received registration cryptogram with a registration cryptogram associated with user device and stored by server computer.

In some embodiments, the server computer can be configured to generate a cryptogram key using the limited use key (LUK) associated with the user device. The server computer can be further configured to decrypt the received registration cryptogram using the cryptogram key to determine a decrypted value. The decrypted value can be compared with the registration data that is provided to the user device. The registration cryptogram is verified if the decrypted registration cryptogram matches the registration data.

C. Data Flow Diagram

Figure 10:
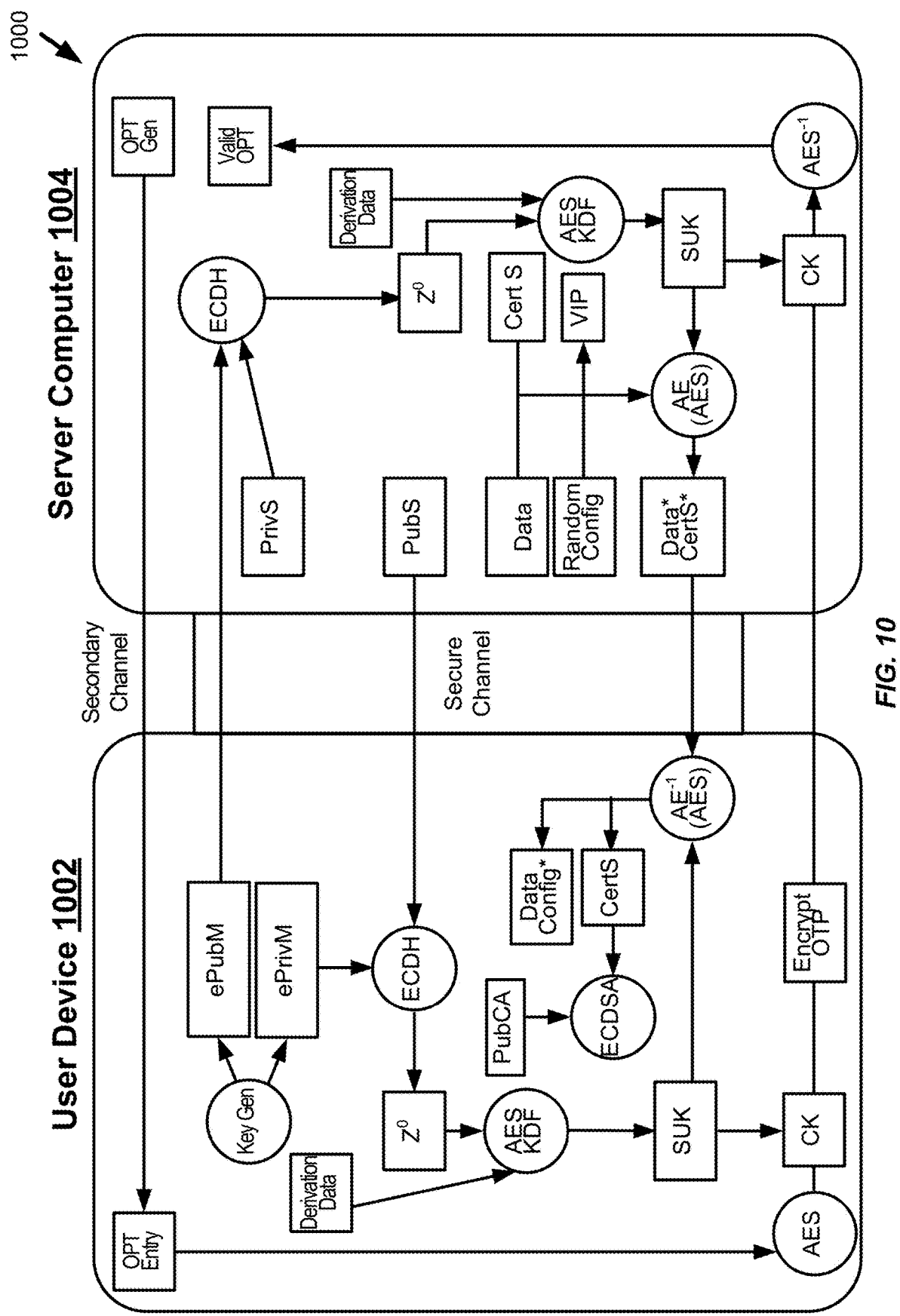
FIG. 10 shows a data flow diagram of an example enrollment process, in accordance with some embodiments.

FIG. 10 shows a data flow diagram of an example enrollment process 1000, in accordance with some embodiments. As shown in FIG. 10, a user device 1002 may generate an ephemeral mobile public/private key pair (ePubM/ePrivM). The ephemeral mobile public/private key pair may be blinded. User device 1002 may provide the ephemeral mobile public key (ePubM) to a server computer 1004. The server computer may use the ephemeral mobile public key (ePubM) and a server private key (PrivS) to generate a shared secret ($Z^0$) using an elliptic curve Diffie-Hellman function (ECDH). The shared secret may be known by both the user device and the server computer at both ends of the secure channel. The shared secret can be based on server negotiated parameters, algorithm, and/or server certificate choices. In some embodiments, the shared secret ($Z^0$) can include the second (response) shared secret discussed herein. The shared secret be used to produce a new recurring shared secret ($Z''$ or Next Z) for each subsequent transaction. In some embodiments, the next shared secret can be derived using a negotiated key derivation function (e.g., AES) with static known but randomized, obfuscated, or white-box crypto protected parameters.

The shared secret ($Z^0$) and key derivation data parameters (derivation data) may be used to derive a single use key (SUK). The single use key may be used with an authenticated encryption (AE) algorithm to encrypt data such as a server certificate (Cert S) and key derivation data (Deriv. Data). In addition, randomization of parameters and algorithm choice configuration (Random Config) can be used as input to the AES KDF functions. The randomization configuration can be used to obfuscate key derivation parameters and/or deployment of a piece of software code (VIP) to the user device. The software code can include a software development kit (SDK) related to a payment application (e.g., an electronic wallet application). The code can be signed by the server or other vendor, so that the user device can authenticate the code. During deployment, the software code may be personalized or randomized (e.g., based on the randomization configuration) for specific user devices or groups of user devices such that different user devices do not show a consistent pattern of key behavior. In some embodiments, at least two levels of obfuscation are provided on the server side. At a first level, the server can relatively randomly assign different ways to calculate the key derivations and the cryptograms based on the combination of attributes used, the order of attributes used and the code path in the code to be used. In some cases, after the server has randomly chosen the set of attributes for key derivation, the ordering of the attributes, and/or the code path for the cryptographic algorithm, a bitmap may be generated that contains these instructions to be passed on to the user device in the encrypted response data. Thus, for each user device or each group of user devices and/or for each registration or re-sync, the combination of attributes used, the order of attributes used and the code path in the code to be used can be different. This approach makes it harder for a fraudster to reverse engineer the software code or to derive a key from stolen parameters. At a second level, different code sets can be released to different communities of devices such as an organization (e.g., an issuer bank), a geographic area, or a specific application for an organization. Thus, the size of the community that reverse engineering can target can be changed from all applications that accept certain PANs to a subsets of that community. By varying the software across different communities of user devices, this approach limits the ability of an attacker to build malicious software (e.g., malware) that is reusable across different devices and hence the damage of potential security breach. In some embodiments, each release of an application can use a new set of code but the size of the community for the new code set is preferably large enough be signed and visible within online app store (e.g., Google Play store or equivalent.

The randomization configuration, data (e.g., related to key derivation, update parameters, and/or cryptogram derivation), and server certificate (Cert S), along with any other suitable information, can be encrypted to generate the encrypted response data. For example, the encrypted response data can include the encrypted server certificate (CertS*) and encrypted data (Data*). The data (e.g., key derivation parameters) may be obfuscated using the random configuration before being encrypted. As discussed above, the data can include a bitmap that includes instructions to be passed on to the user device regarding the randomly chosen the set of attributes for key derivation, the ordering of the attributes, and/or the code path for the cryptographic algorithm. The bitmap can be included in the encrypted response data. The encrypted response data can be provided to the user device 1002.

The user device 1002 may determine the shared secret (Z) using the ephemeral mobile private key (ePrivM) and the server public key (Pub S), the latter may be provided by the server computer 1004. User device 1002 can generate the single use key (SUK) using the shared secret ($Z^0$) and derivation data. The derivation data can include previously provisioned key derivation parameters, cryptogram derivation parameters, and the like. The single use key (SUK) can be used to decrypt the encrypted response data (including the encrypted data (Data*), encrypted server certificate (CertS*) to obtain the decrypted values. The server certificate (CertS) can be verified using a certificate authority public key (PubCA) and an elliptic curve digital signature algorithm (ECDSA). In some cases, some or all of the decrypted data (such as including the bitmap discussed above) may be further obfuscated (Data Config*) for storage (e.g., using white box crypto technology).

The SUK may be used to determine a cryptogram key (CK) that is used to encrypt registration data (e.g., one-time password (OTP)) generated by the server computer 1004 and transmitted to user device 1002 over a secondary channel. The secondary channel may be separate from the secure channel used for communication of the request and response messages between the user device 1002 and the server computer 1004. The encrypted registration data (Encrypt OTP) can then be provided to the server computer 1004, which can decrypt the encrypted registration data (e.g., OTP) using the cryptogram key to verify the validity of the registration cryptogram.

D. Example Enrollment Flow

Figure 11:
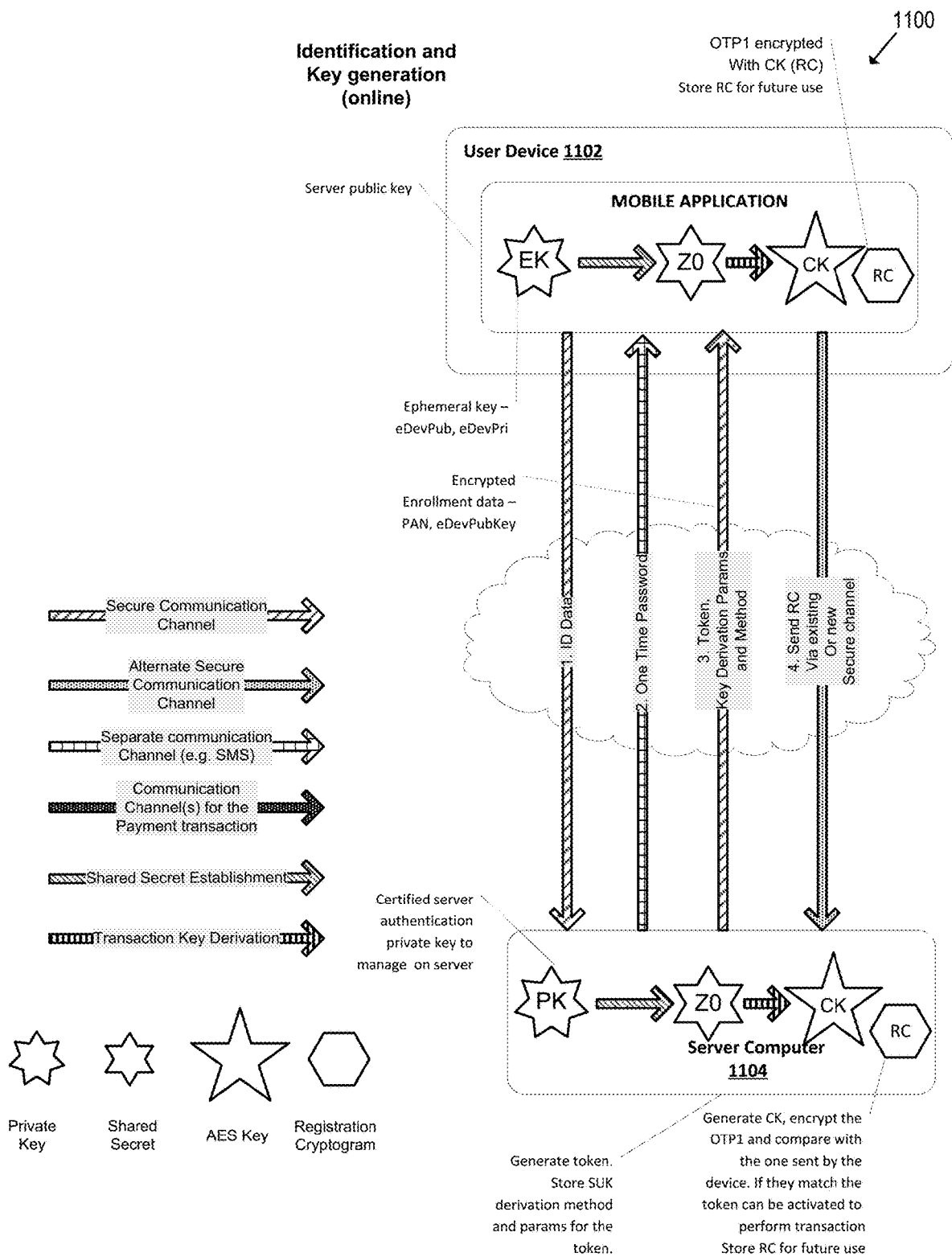
FIG. 11 shows a block diagram of an example enrollment process, in accordance with some embodiments.

FIG. 11 shows a block diagram of an example enrollment process 1100, in accordance with some embodiments. As shown in FIG. 11, four messages may be exchanged between user device 1102 (e.g., user device 101) and a server computer 1104 (e.g., payment processing network computer 105 or issuer computer 106) as part of an identification and key derivation process for enrollment of a device.

In a first message, user device 1102 may provide to the server computer identification data relating to user device 1102 and/or a user associated with user device 1102. For example, identification information may include authentication credentials such as a username and password. In addition, user device 1102 may generate an ephemeral public/private key pair, and provide the ephemeral public key to payment processing network 105. In some embodiments, the first message may be transmitted over a secure communication channel. For example, the first message might be encrypted using a session key derived from a shared secret ($Z_0$) that is determined from the public key associated with the server computer 1104 and the ephemeral private key (EK).

In a second message, server computer 1104 transmits registration data (e.g., one-time password) to user device 1102. Typically, the registration data (e.g., one-time password) may be transmitted to user device 1102 using a separate communication channel. For example, the registration data (e.g., one-time password) may be transmitted over SMS, email, etc., and entered manually into user device 1102 by a user.

Prior to sending a third message from server computer 1104 to user device 1102, server computer 1104 may derive a shared secret ($Z_0$) associated with user device 1102 using the ephemeral public key received from user device 1102 and a private key associated with server computer 1104 (PK). The shared secret may be used to generate a session key. Server computer 1104 may also determine key derivation parameters for user device 1102. A "key derivation parameter" may include any information used to determine a method for key derivation, such as a key derivation algorithm, parameters to use with an algorithm, etc. For example, in one embodiment, the key derivation parameters may include a bitmap that identifies one or more key derivation algorithms to be used when deriving a key on user device 1102. Once key derivation parameters are determined, server computer 1104 may encrypt the key derivation parameters using the session key and provide the encrypted key derivation parameters to user device 1102. In some embodiments, the third message may also include a token (e.g., a payment token) that may be encrypted using the session key.

In some embodiments, a list of algorithms (e.g., key derivation algorithms or functions) and parameters (e.g., key derivation parameters and/or update parameters) discussed herein can be unique to a specific device or a specific group of devices so as to prevent reverse engineering. The variation from device to device may be based on the software development kit (SDK) installed on the device. In some embodiments, the exact algorithm and/or parameters used for deriving a particular key or a shared secret can be identified using a bitmap stored on the device. The interpretation of the bitmap and the mapping of the bitmap to the actual list of algorithms and/or parameters can vary by the device-specific SDK. For example, on one device, the list of algorithms stored may be {alg1, alg2, . . . , alg8}, while on another device, the list of algorithms stored can be {alg3, alg5, . . . , alg1}. Similarly, the lists of key derivation parameters and/or update parameters can also be stored in differently on different devices. In some embodiments, the algorithms and/or parameters may be listed in a random fashion on some or all of the devices. The bitmap may point to the right index in the list of algorithms and/or parameters to be used for the actual key generation. In some embodiments, the response data provided by a server computer can include a bitmap that points to proper algorithms and/or parameters to be used by a user device to generate keys and/or shared secrets. In some cases, the bitmap provided by the server computer may be generated specifically for a given user device based on the order in which the algorithms and/or parameters are stored on the user device.

In some embodiments, the key derivation algorithms and/or parameters may be listed in a random fashion on some or all of the devices. The bitmap may point to the right index in the list of key derivation algorithms and/or parameters to be used for the actual key generation. The bitmaps may be stored on the server computer 1104 and/or the user device 1102. In some embodiments, a bitmap can be included in a message from the user device 1102 to the server computer 1104, or in a message from the server computer 1104 to the user device 1102. The bitmap may point to proper algorithms and/or parameters to be used by the receiving device to generate or derive various keys. In some embodiments, the bitmap may be generated specifically for the receiving device as the order in which the algorithms and/or parameters are stored on the user device may vary, as discussed above.

Prior to sending a fourth message from user device 1102 to server computer 1104, user device 1102 may decrypt the encrypted key derivation parameters using the session key. User device 1102 may then derive a cryptogram key (CK) using the key derivation parameters and the shared secret. User device 1102 can use the cryptogram key to encrypt the registration data (e.g., one-time password) received in the second message to determine a registration cryptogram (RC). User device 1102 then sends a fourth message including the registration cryptogram over a secure channel. Server computer 1104 can also derive the cryptogram key and generate the registration cryptogram. If the received and generated cryptograms match, the token provided to user device 1102 can be activated and enrollment of user device 1102 can be confirmed. In some embodiments, both user device 1102 and server computer 1104 can store the registration cryptogram for future use.

IV. Ongoing Validation Using Updated Shared Secrets

Embodiments can use the systems and apparatuses described above to conduct payment transaction between a server computer to a user device. In particular, for a given transaction (or other secure communications), an updated/rolling shared secret can be generated based on a previous shared secret. Based on the updated shared secret and a previously-provisioned limited use key (LUK), a new cryptogram key can be generated and used to generate a transaction cryptogram that is in turn used to authenticate the transaction.

FIGS. 12-15 describe some examples of such methods. In some embodiments, the user device may include the user device 101 or 200 of FIGS. 1 and 2, respectively. The server computer may include the device 102, 103, 104, 105, 106, or 300 of FIGS. 1 and 3, respectively.

A. User Device

Figure 12:
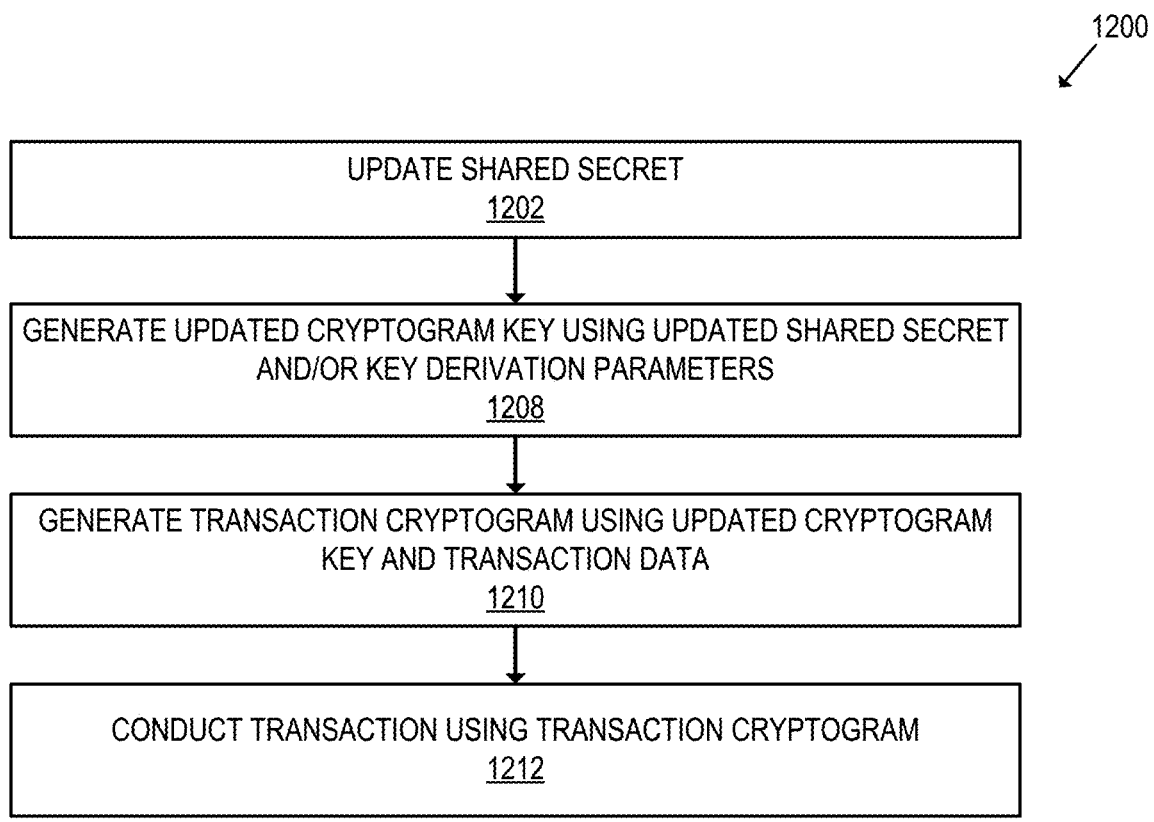
FIG. 12 shows an example transaction process or method for conducting a transaction, in accordance with some embodiments.

FIG. 12 shows an example transaction process or method 1200 for conducting a transaction between a user device and a server computer, in accordance with some embodiments. Aspects of the process 1200 can be performed by a user device 101 or 200 of FIGS. 1 and 2, respectively.

At step 1202, a shared secret is optionally updated. In some embodiments, the shared secret can be a shared secret that is determined as part of a provisioning process, e.g., as described above. The provisioning process can occur as an initial part of the transaction, or can be performed at an earlier time. Updating the shared secret may be performed in any suitable manner. For example, an updated shared secret may be generated as a function of the previous shared secret and other information such as a device identifier. For example, in one embodiment, the updated shared secret may be the result of hashing the previous shared secret and other data. In some embodiments, the next shared secret may be determined using update parameters such as device and account parameters and configuration information. In some embodiments, the update parameters may be unique to a specific user device or a specific group of user devices. One or more of the update parameters for determining the updated shared secret can be similar to or different from the key derivation parameters received in a previous response message (e.g., a provisioning response message). In some embodiments, the update parameters may be provided with the key derivation parameters in the previous response message. In some other embodiments, the update parameters may be provided in a separate message than the message that contains the key derivation parameters.

In some embodiments, a LUK can optionally be determined. The LUK may have been previously provisioned to the user device during a provisioning process such as discussed in FIGS. 8-11. In some embodiments, the LUK may have been encrypted (e.g., using a session key) and determining the LUK may include decrypting the encrypted LUK. In some embodiments, the step 1206 may be omitted and an LUK is not determined.

At step 1208, a cryptogram key can be generated using the updated shared secret and key derivation parameters. The key derivation parameters can include key derivation data and/or key derivation algorithms indicated in previous response messages from the server computer (e.g., provisioning response message or authentication response message). For example, LUK and/or the updated shared secret may be provided as input into a key derivation function, along with certain key derivation data to produce the cryptogram key. As another example, the LUK may be used as the cryptogram key. In some embodiments, the LUK and/or the cryptogram key generated using the LUK is a single use key (SUK) that is only valid for one single transaction. In other embodiments, the LUK and/or the cryptogram key generated using the LUK may be used repeatedly for more than one transaction.

At step 1210, a transaction cryptogram can be generated using the cryptogram key. In some embodiments, the transaction cryptogram is further generated using transaction data based on cryptogram derivation parameters that were sent as part of the initial provisioning process. In some embodiments, the transaction cryptogram can also include transaction data (e.g., transaction amount, transaction date, etc.) and user/account details (e.g., a payment token, account expiration date, etc.) that are encrypted using the cryptogram key.

At step 1212, the transaction cryptogram can be used to conduct a transaction (or other secure communication). Generally, a transaction cryptogram authenticates a transaction. For example, in some embodiments, user device may provide a payment token or PAN and transaction cryptogram to an access device or merchant computer, which may then generate an authorization request message for the transaction. The authorization request message can include the transaction cryptogram. The transaction cryptogram can be verified by an entity receiving the authorization request message (e.g., a payment processing network computer 105, an issuer computer 106, a validation server) in order to determine whether to approve or deny the transaction.

In some embodiments, the transaction cryptogram is used to conduct a second secure communication with a validation server. The second secure communication can be an authorization transaction, wherein the second cryptogram authenticates at least one element of the authorization transaction.

In some embodiments, new shared secrets may be generated for each of a plurality of new secure communications, each new shared secret generated using a previous shared secret and the update parameters. New cryptogram keys can be derived using the new shared secrets and the key derivation parameters. New cryptograms can be generated using the new cryptogram key. New secure communications can be conducted the validation server computer using the new cryptograms.

B. Server Computer

Figure 13:
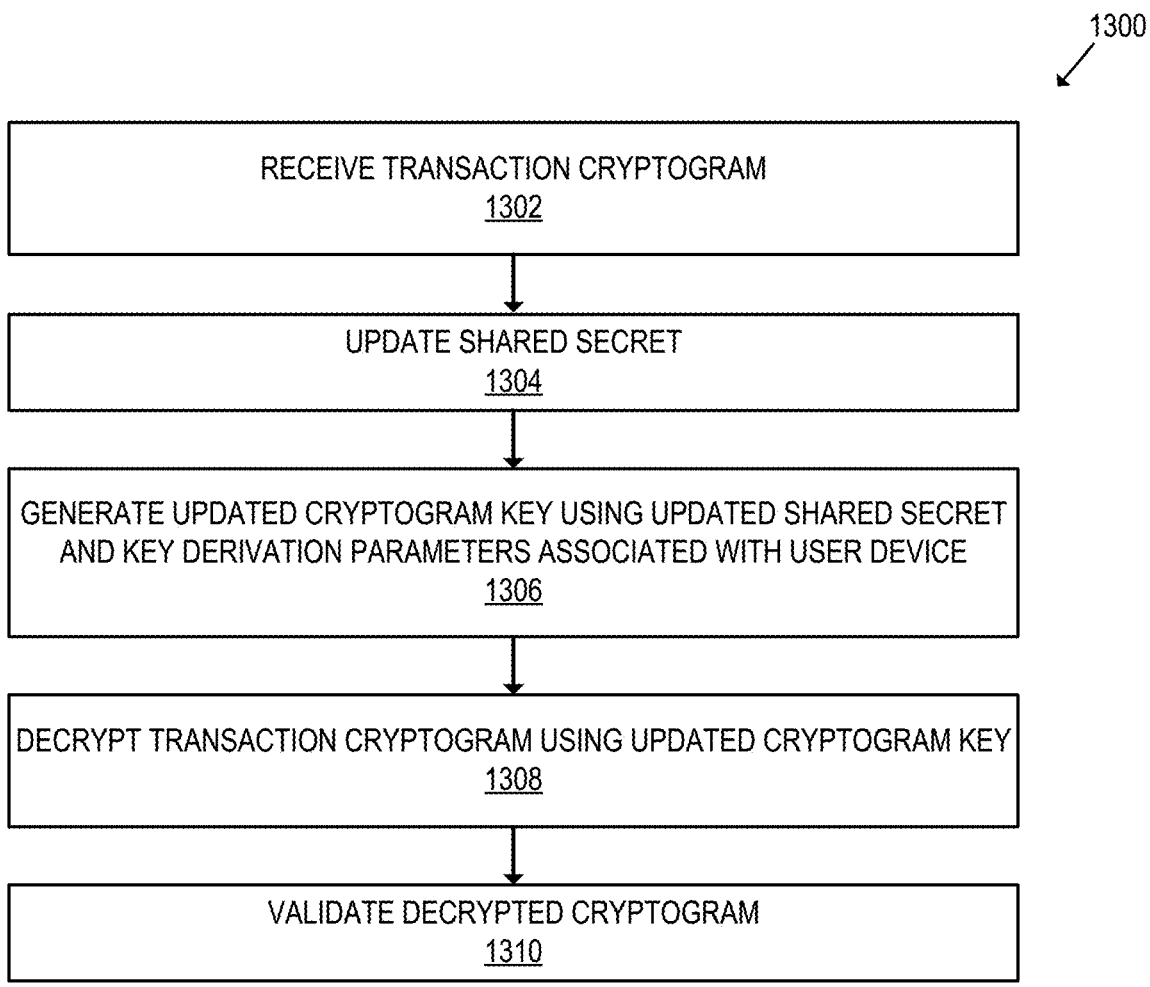
FIG. 13 shows an example transaction process or method for conducting a transaction, in accordance with some embodiments.

FIG. 13 shows an example transaction process or method 1300 for conducting a transaction between a user device and a server computer, in accordance with some embodiments. Aspects of the process 1300 can be performed by a server computer 102, 103, 104, 105, 106, or 200 of FIGS. 1 and 3, respectively. In some embodiments, the process 1300 is performed by a validation server that may be configured to process payment transactions.

At step 1302, a transaction cryptogram for a transaction can be received. The transaction cryptogram may have been generated by a user device using the method 1200 discussed above.

At step 1304, a shared secret can optionally be updated. In some embodiments, the shared secret can be a shared secret that is determined as part of an earlier provisioning process, e.g., as described above. In other embodiments, an authorization transaction (e.g., to access a resource, such as a document or computer) can occur at a same time as the provisioning process. Updating the shared secret may be performed in any suitable manner. For example, an updated shared secret may be generated as a function of the previous shared secret and other information such as a device identifier. A stored shared secret can be updated to determine an updated shared secret. For example, in one embodiment, the updated shared secret may be the result of hashing the previous shared secret and other data. In some embodiments, the next shared secret may be determined using update parameters such as device and account parameters and configuration information. In some embodiments, the update parameters may be unique to a specific user device or a specific group of user devices. Along with shared secret, other information may be updated (e.g., using update parameters) to prepare for the next SUK generation including key derivation parameters, counters, nonces, transaction data, and the like. In some cases, such generation of the update secret and/or any other necessary information can be performed when the device is offline. As discussed above, any information that is no longer needed locally (e.g., previous shared secret(s), previous derivation parameters, transaction data, etc.) can be deleted, removed, or otherwise rendered inaccessible, preferably immediately after or soon after a time when such information is no longer needed.

At step 1306, an updated cryptogram key can be generated using the updated shared secret and/or key derivation parameters associated with the user device. In some embodiments, the key derivation parameters may be retrieved from a database.

At step 1308, the transaction cryptogram can be decrypted using the updated cryptogram key. In some embodiments, the transaction cryptogram has been generated, by the user device, using transaction data based on cryptogram derivation parameters that were sent as part of the initial provisioning process. In some embodiments, the transaction cryptogram can also include transaction data (e.g., transaction amount, transaction date, etc.) and user/account details (e.g., a payment token, account expiration date, etc.) that are encrypted using the cryptogram key.

At step 1310, the cryptogram can be validated. For example, validating the cryptogram can include verifying that the decrypted cryptogram includes the token or PAN used to conduct the transaction. Validation of the cryptogram can also include verifying the transaction data included in the decrypted cryptogram. Validating the cryptogram can also include verifying that the cryptogram and/or cryptogram key have not been used repeatedly beyond the permitted limits. For example, if the cryptogram key is a single use key (SUK), then the same cryptogram key being used twice may indicate that the shared secret has been compromised. In addition, in some cases, if the cryptogram cannot be validated against the next expected cryptogram key, it may be validated against a predetermined number of future cryptogram keys (e.g., 5 or fewer). This may allow validation to tolerate small synchronization issues (e.g., if two or more payment transactions are processed in a different order than they were conducted in, or if a transaction was canceled after a cryptogram was generated for the transaction but before the transaction was submitted to server computer).

In some embodiments, validating the transaction cryptogram may include comparing the received transaction cryptogram with a transaction cryptogram associated with user device and stored by server computer.

If the cryptogram is invalid, the transaction may be declined. Otherwise, processing of the transaction may continue (e.g., an authorization request for the transaction may be forwarded to the next server computer (e.g., from a payment processing network computer 105 to an issuer computer 106).

C. Data Flow Diagram

Figure 14:
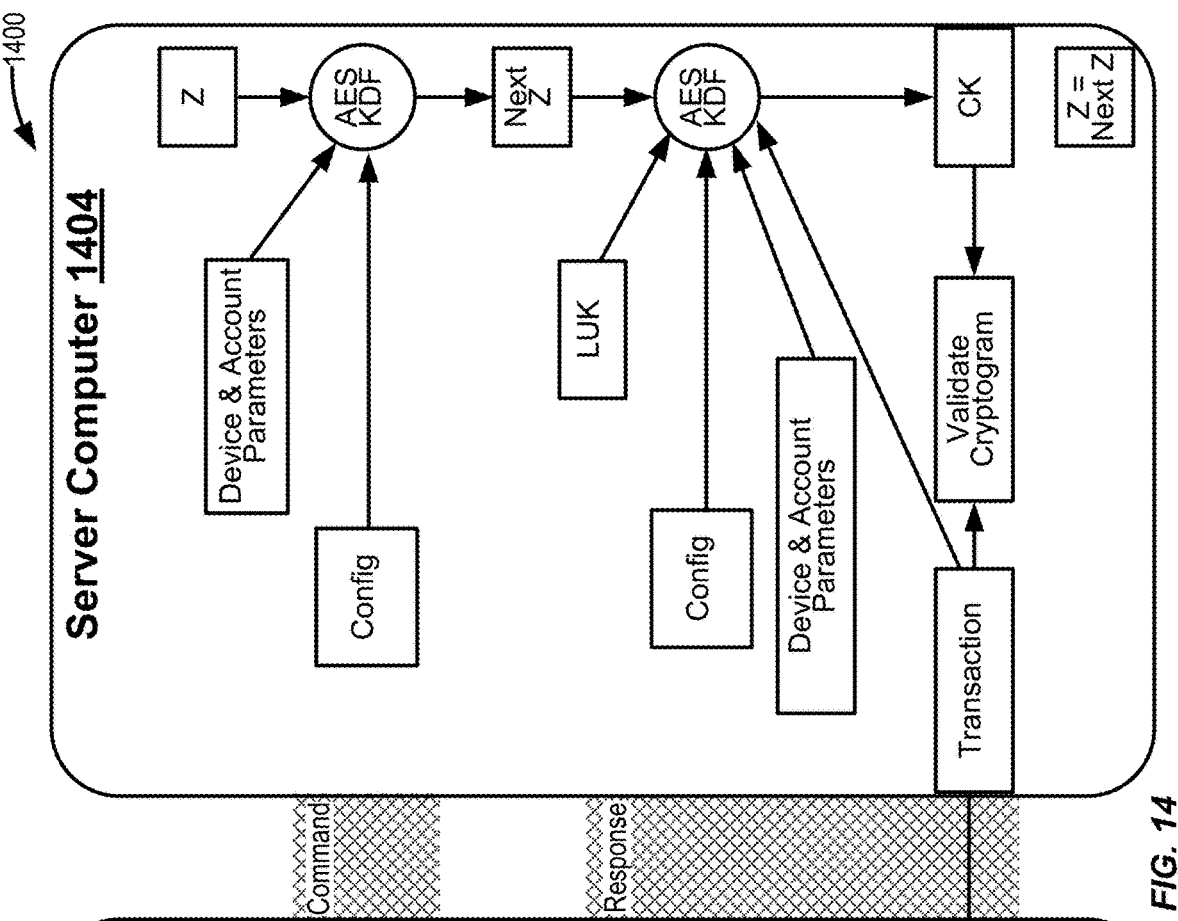
FIG. 14 shows a data flow diagram of a transaction process, in accordance with some embodiments.
Figure 14:
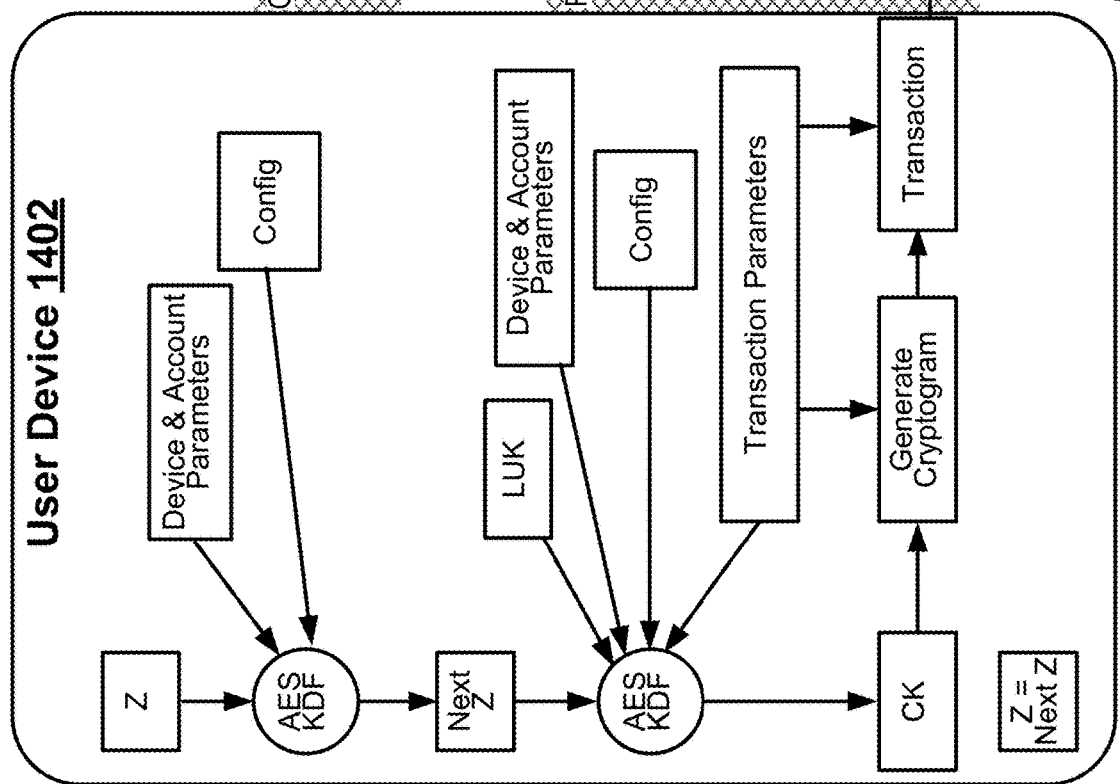

FIG. 14 shows a data flow diagram of a transaction process 1400, in accordance with some embodiments. As shown in FIG. 14, a user device 1402 may determine a shared secret (Z) and use the shared secret (Z), along with other key derivation parameters (e.g., device and account parameters and/or configuration information), as inputs to a key derivation function (AES KDF) to determine an updated shared secret (NextZ). A LUK, updated shared secret, device and account parameters, configuration information), transaction parameters (e.g., token, transaction amount, timestamp, random number, etc.) and other information may be used as inputs to a key derivation function (AES KDF) to determine a cryptogram key (CK). In some embodiments, AES is the preferred cryptographic algorithm used for generating the next shared secret and/or LUK (e.g., SUK) at transaction time because of its faster performance over other methods (e.g., hashing or elliptic-curve (EC) operations). The LUK may have been previously provisioned onto the user device 1402 (e.g., during a provisioning process). The key derivation function that is used to determine the cryptogram key may or may not be the same the as the key derivation function that is used to determine the updated shared secret. The cryptogram key can be a limited use key. In an example, the cryptogram key is a single use key (SUK) that is valid for only a single transaction. The cryptogram key can then be used to generate a cryptogram for use in a transaction. The cryptogram may be generated, for example, by encrypting transaction parameters (e.g., transaction amount, transaction timestamp, random number, etc.) using the cryptogram key.

Upon receiving the transaction cryptogram, the server computer 1404 can derive the cryptogram key in a similar manner as described above for the user device 1402. The cryptogram can be decrypted using the cryptogram key and decrypted cryptogram can be validated in a similar manner as described above in step 1310 of method 1300 in FIG. 13.

D. Example Transaction Flow

Figure 15:
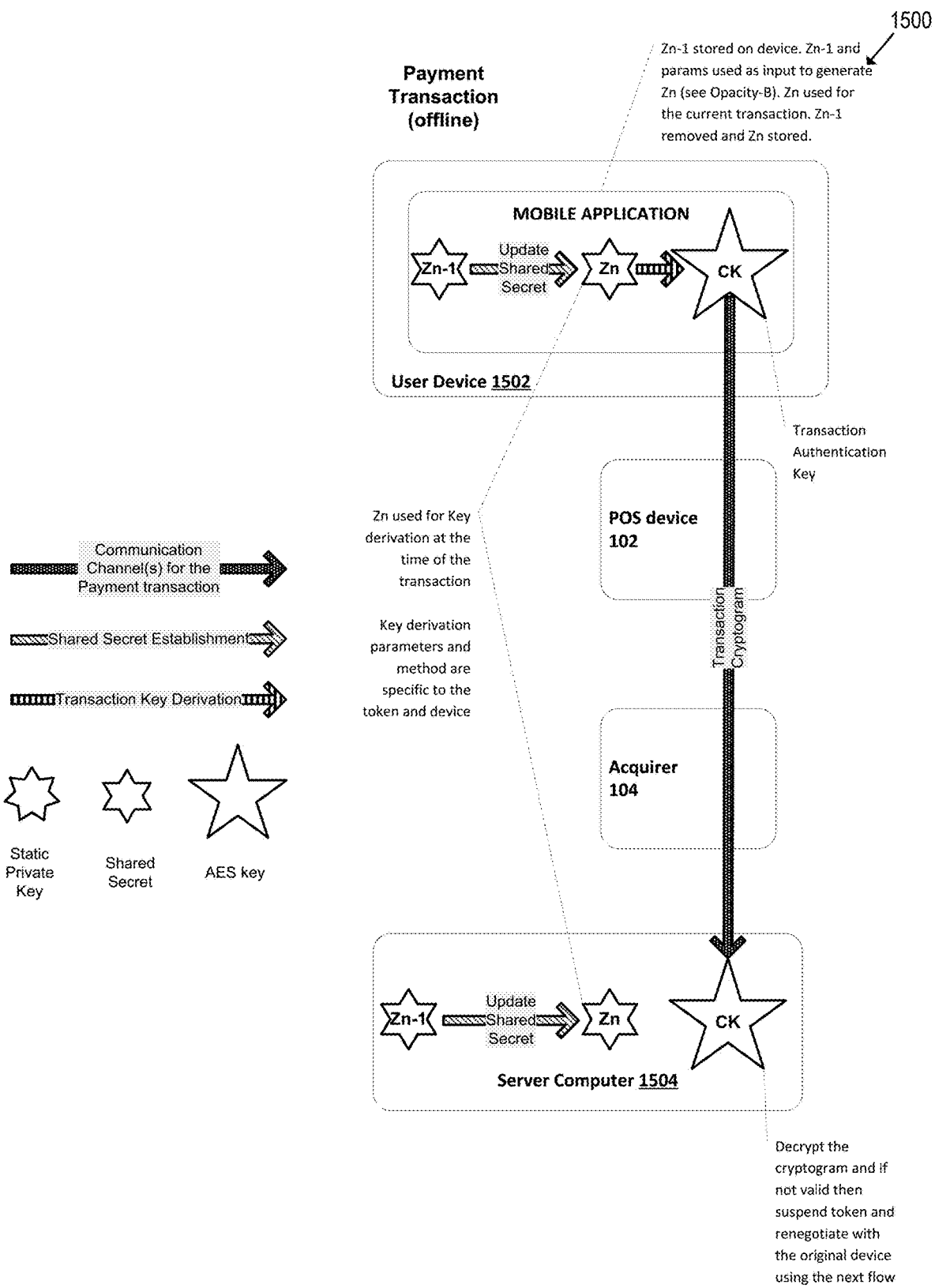
FIG. 15 shows a block diagram of a transaction process, in accordance with some embodiments.

FIG. 15 shows a block diagram of a transaction process 1500, in accordance with some embodiments. In some embodiments, the block diagram shown in FIG. 15 may allow a payment transaction to be conducted offline (i.e., so that user device does not need a network connection to the Internet or other wide area network (WAN).

As shown in FIG. 15, a mobile application running in user device 1502 (e.g., user device 101 of FIG. 1) may be used to conduct a payment transaction. For example, the user device 1502 may be physically presented to a merchant (e.g., during an NFC transaction), or may send transaction details to a merchant computer 103 over a network such as the Internet.

In order to conduct the transaction, user device 1502 may first update a shared secret stored on the device ($Z_{n-1}$). Updating the shared secret may be performed in any suitable manner. For example, an updated shared secret ($Z_n$) may be generated as a function of the previous shared secret ($Z_{n-1}$) and other information such as a device identifier.

Once an updated shared secret ($Z_n$) is determined, the updated shared secret may be used to generate a cryptogram key (CK). The cryptogram key may be a limited use key (LUK). In some cases, the cryptogram key can be a single use key (SUK). The cryptogram key may be used to generate a transaction cryptogram that is transmitted by user device 1502. The transaction cryptogram may be generated in any suitable manner. For example, in some embodiments, the transaction cryptogram may be a combination of transaction details (e.g., transaction amount, transaction date, etc.) and user/account details (e.g., a payment token, account expiration date, etc.) that are encrypted using the cryptogram key.

In some embodiments, the cryptogram key can be generated using a LUK that has been previously provisioned onto the user device 1502. The LUK may have been provisioned in an encrypted form using a secure provisioning method described in FIGS. 8-15.

The transaction cryptogram may be sent via POS device 102 and acquirer computer 104 to a server computer 1504 (e.g., a payment processing network computer 105 or an issuer computer 106). In some embodiments, the transaction cryptogram may be included in an authorization request message. The server computer 1504 may then update a shared secret associated with user device 1502, determine a cryptogram key associated with the device based on the updated shared secret, and use the cryptogram key to decrypt the received transaction cryptogram. If the transaction cryptogram is determined to be valid, the server computer 1504 may authorize the transaction or cause further processing of the transaction (e.g., fraud analysis). Otherwise, if the transaction cryptogram is determined to be invalid, the server computer 1504 may decline the transaction.

V. Key Renewal Methods

Embodiments can use the systems and apparatuses described above to renew enrollment of a user device with a server computer. In particular, during a renewal process, a new shared secret may be established between the user and the server computer. Additionally, new parameters (e.g., new key derivation parameters, new cryptogram derivation parameters, and/or new update parameters) may be provisioned onto the user device to be used for generating cryptograms and/or cryptogram keys.

FIGS. 20-22 describe some examples of such methods. In some embodiments, the user device may include the user device 101 or 200 of FIGS. 1 and 2, respectively. The server computer may include the device 102, 103, 104, 105, 106, or 300 of FIGS. 1 and 3, respectively.

A. User Device

Figure 16:
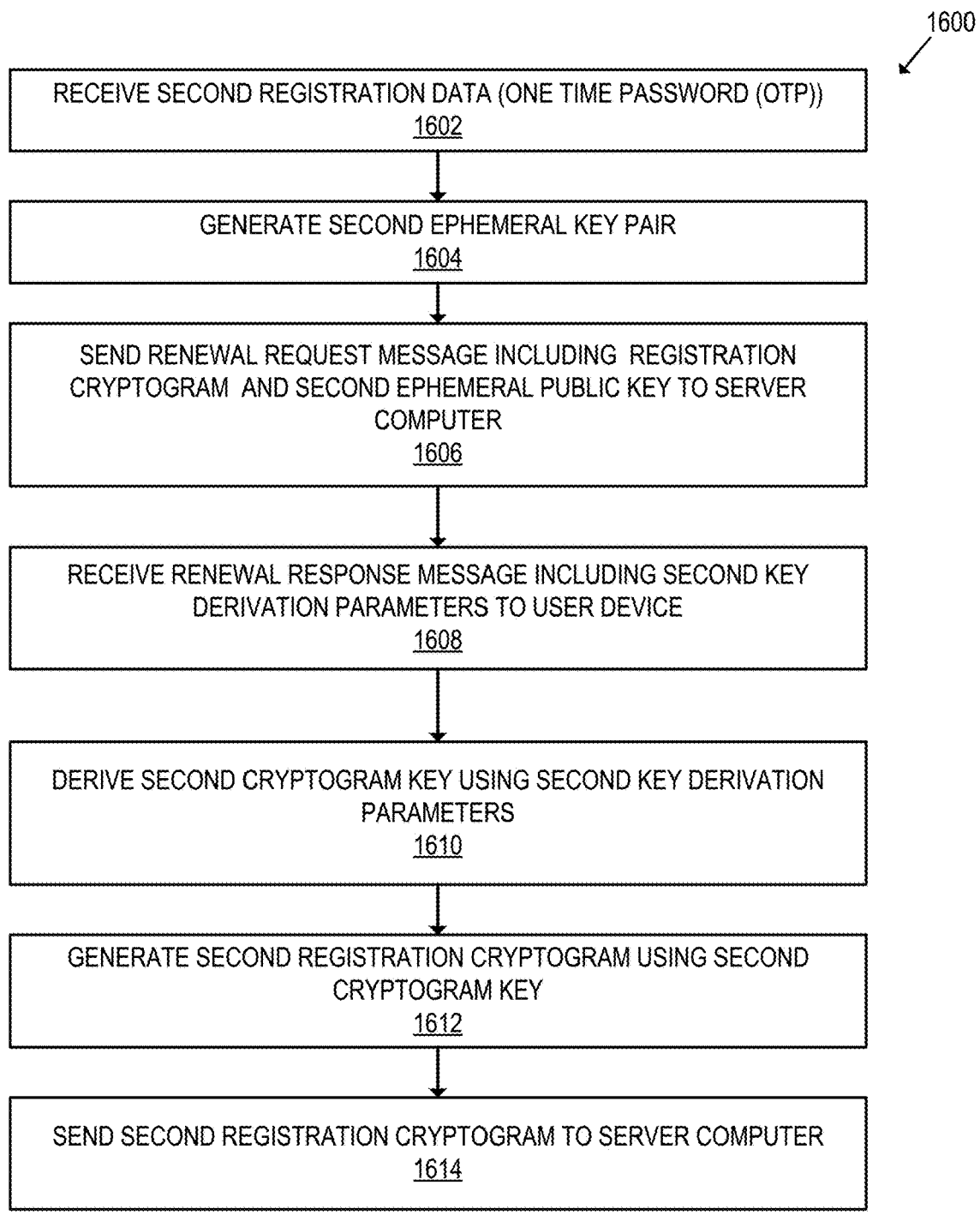
FIG. 16 shows an example renewal process or method for renewing a user device's enrollment with a server computer, in accordance with some embodiments.

FIG. 16 shows an example renewal process or method 1600 for renewing a user device's enrollment or registration with a server computer, in accordance with some embodiments. Aspects of the process 1600 can be performed by a user device 101 or 200 of FIGS. 1 and 2, respectively. In some embodiments, a key renewal process may be initiated at pre-determined time intervals, after a number of transactions have been conducted, when a cryptogram key is suspected to be compromised, and the like.

At step 1602, second registration data (e.g., a second one-time password) can be received. The first registration data may have been received in a previous registration process such as at step 808 of FIG. 8. In various embodiments, registration data can include other data instead of or in addition to an OTP. For example, the registration data can include non-password data such as static string, unique device or user identifier, dummy transaction data, and the like. Any other registration data can be used as long as it is verifiable.

In some embodiments, the second registration data may be sent in response to a request for the second registration data that is sent from the user device (e.g., by a payment application running on the user device).

In some embodiments, the second registration data may be transmitted to user device over a secondary communication channel that is separate from the communication channel used for enrollment and/or transaction request/response messages. For example, the second registration data may be included in a text message, email, phone call, online chat, facsimile, postal mail, or the like. In some embodiments, the second registration data may be sent to another device and entered into user device by a user. For example, if user device is a user's mobile phone, the registration data (e.g., one-time password) may be sent to a user's desktop computer and entered by the user into user device.

At step 1604, a second ephemeral public/private key pair can be generated. The first ephemeral public/private key pair may have been generated during the last provisioning/renewal process. In some embodiments, generation of the second ephemeral public/private key pair can be similar to the generation of the first ephemeral public/private key pair.

At step 1606, a renewal request message can be sent to the server computer. The renewal request message can include a registration cryptogram. In some embodiments, the registration cryptogram may be a cryptogram determined during an initial enrollment process, such as at step 812 of method 800. The registration cryptogram may have been stored on the user device. The renewal request message can also include a hash of the second registration data, and the second ephemeral public key of the user device. The renewal request message can also include other data similar to the data included in the initial enrollment/provisioning request such as device or user identifier information, client configuration information or service directives.

In some embodiments, the renewal request message may be encrypted using a message protection key (e.g., session key) that is derived from a shared secret. For instance, a new shared secret can be generated based on the second ephemeral private key and a server computer public key. The new shared secret can be used to generate a session key which may be used to encrypt some or all data included in the renewal request message.

At step 1608, a renewal response message can be received from the server computer. The renewal response message can include second key derivation parameters for generating cryptogram keys. For example, the renewal response message can optionally include a second limited use key (LUK) for the user device. The renewal response message can also include a server computer public key (that may or may not be blinded). In some embodiments, the renewal response message may include other data such as second update parameters, second cryptogram derivation parameters, and the like.

In some embodiments, the renewal response message can be encrypted using a first session key that is generated based on the new shared secret. In such embodiments, the first session key may be used to decrypt the renewal response message. In some other embodiments, a second shared secret can be generated based at least in part on the second ephemeral private key of the user device, the server computer public key, and the second key derivation parameters. In such embodiments, the second shared secret can be used to generate a second session key and the second session key may be used to decrypt the renewal response message.

At step 1610, a second cryptogram key can be derived using the second ephemeral private key of the user device, the server computer public key, and/or the second key derivation parameters. A first cryptogram key may have been previously generated during a provisioning process (e.g., at step 810 of method 800). In some embodiments, the new shared secret can be determined based on the second ephemeral private key of the user device and/or the server computer public key. The new shared secret and the second key derivation parameters (which may or may not include the second LUK) can be used to generate the second cryptogram key. In some other embodiments, a second shared secret can be generated using the second ephemeral private key of the user device, the server computer public key (which may or may not be blinded), and/or the second key derivation parameters.

At step 1612, a second registration cryptogram can be generated using the second cryptogram key (RC). The second registration cryptogram may be generated by encrypting the second registration data using the second cryptogram key. Additionally or alternatively, the registration cryptogram may be generated using other data such as identification data, authentication data, other information extracted from the credentials and/or the response message, and the like.

At step 1614, the second registration cryptogram can be sent to the server computer (e.g., registration server) for verification in a renewal response message. The second registration cryptogram can be used to authenticate the user device. Prior to sending the second registration cryptogram, the second registration cryptogram may be encrypted using a session key (e.g., the first session key or the second session key) or another key (e.g., the LUK, a public key of the server computer, or a shared secret key). If the received registration cryptogram is verified, user device may be re-enrolled successfully.

In some embodiments, the second registration data and optionally a secure element identifier (e.g., SIM ID) can be encrypted with the originally stored registration data (e.g., first registration data) using a key derived under the new shared secret. The encrypted value is then sent to the server for validation. Such embodiments provide additional security because validation of the encrypted value ensures that the requestor (e.g., user device) knows the first and second registration data, as well as the newly negotiated shared secret.

B. Server Computer

Figure 17:
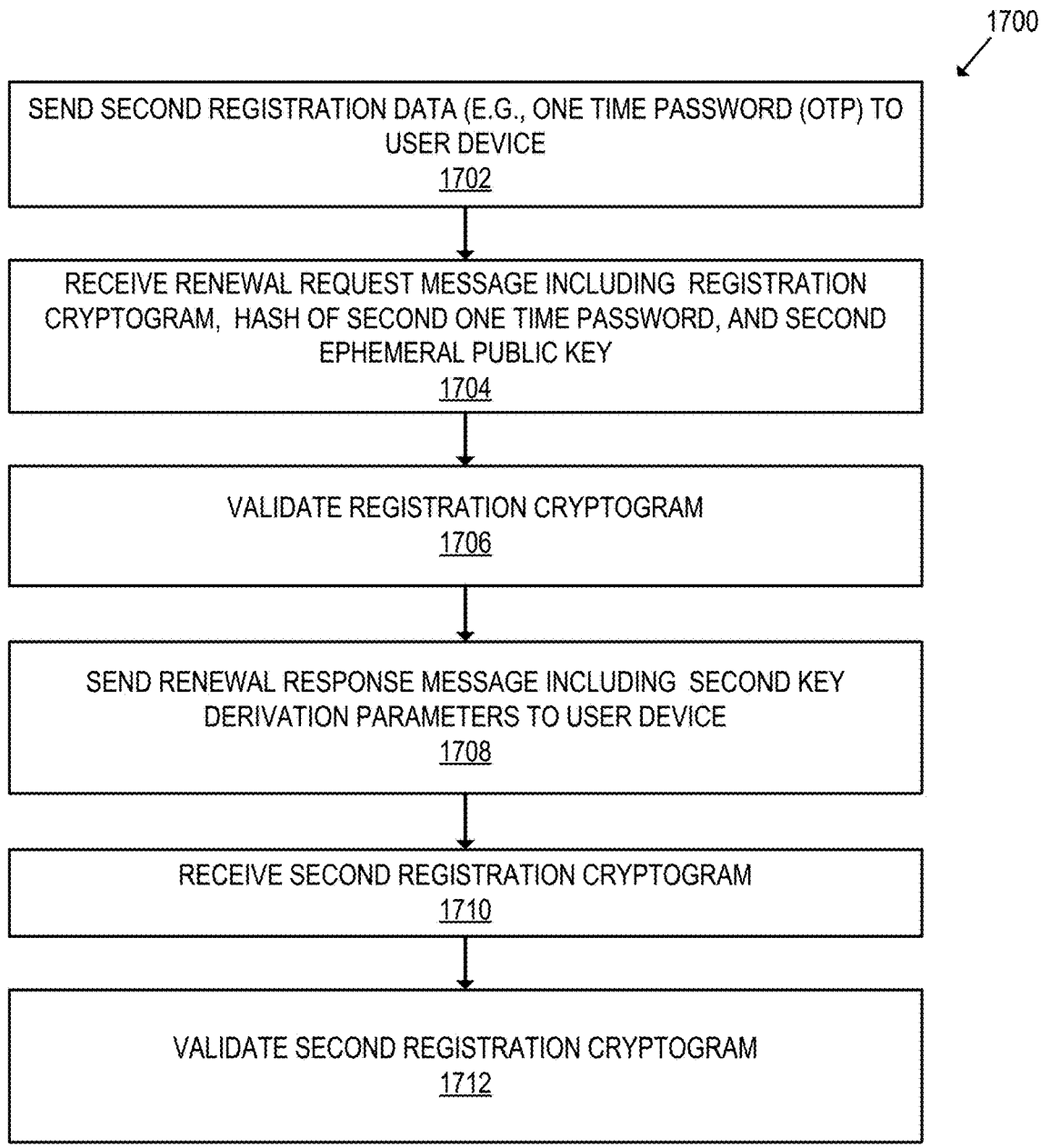
FIG. 17 shows an example renewal process or method for renewing a user device's enrollment with a server computer, in accordance with some embodiments.

FIG. 17 shows an example renewal process or method 1700 for renewing a user device's enrollment with a server computer, in accordance with some embodiments. Aspects of the process 1700 can be performed a server computer such as a server device or computer 102, 103, 104, 105, 106, or 300. For instance, the process 1700 may be implemented by a registration server as discussed herein. Alternatively or additionally, aspects of the process 1700 may be performed by any other suitable entities.

At step 1702, second registration data (e.g., a second one-time password (OTP)) can be sent to a user device. In some embodiments, the second registration data may be transmitted to user device over a secondary communication channel that is separate from the communication channel used for enrollment and/or transaction request/response messages. For example, the second registration data may be included in a text message, email, phone call, online chat, facsimile, postal mail, or the like.

In some embodiments, registration data (e.g., first registration data or second registration data) may be encrypted or otherwise protected using a key (e.g., session key) that is derived from a shared secret. Thus, registration data can be used to validate ownership of users and user devices upon registration or refresh (e.g., renewal). In some embodiments, multiple-factor authentication may be used to instead of or in addition to the registration data.

At step 1704, a renewal request message can be received from the user device. The renewal request message can include a registration cryptogram. In some embodiments, the registration cryptogram may be a cryptogram determined during an initial enrollment process, such as at step 812 of method 800. The renewal request message can optionally include a hash of the second registration data, and the second ephemeral public key of the user device. The renewal request message can also include a hash of the second registration data, and the second ephemeral public key of the user device. The renewal request message can also include other data similar to the data included in the initial enrollment/provisioning request such as device or user identifier information, client configuration information or service directives.

In some embodiments, the server computer can generate a new shared secret using at least the second ephemeral public key of the user device, a private key of the server, and/or key derivation parameters associated with the user device. The new shared secret can be used to generate a first session key, which may be used to decrypt the renewal request message.

At step 1706, the registration cryptogram can be validated. In some embodiments, a hash of the second registration data (e.g., one-time password) may optionally be validated. Validating the registration cryptogram may include comparing the received registration cryptogram with a registration cryptogram associated with user device and stored by server computer. Validating the second registration data (e.g., one-time password) hash may include comparing the received second registration data (e.g., one-time password) hash with a hash of the second registration data (e.g., one-time password) that has been provided to the user device to determine if there is a match.

At step 1708, if the registration cryptogram and/or second registration data (e.g., one-time password) hash are validated, a renewal response message may be generated and sent to the user device. The renewal response message can include second key derivation parameters for the user device. The renewal response message can also include a server computer public key (that may or may not be blinded), second cryptographic nonce, second cryptogram derivation parameters, second update parameters, and/or any other suitable data.

In some embodiments, the renewal response message can be encrypted using a first session key that is generated based on the new shared secret. In such embodiments, the first session key may be used to decrypt the renewal response message. In some other embodiments, a second shared secret can be generated based at least in part on the second ephemeral private key of the user device, the server computer public key, and the second key derivation parameters. In such embodiments, the second shared secret can be used to generate a second session key and the second session key may be used to decrypt the renewal response message.

At step 1710, the second registration cryptogram can be received from the user device. The second registration cryptogram may be encrypted using a session key (e.g., the first session key or the second session key) or another key (e.g., the LUK, a public key of the server computer, or a shared secret key). If the received registration cryptogram is verified, user device may be re-enrolled successfully.

In some embodiments, the second registration cryptogram can be validated 1712 using the second ephemeral public key, the server computer private key, and the second key derivation parameters. For example, in some embodiments, validating the second registration cryptogram may include generating a second cryptogram key using the second ephemeral public key, the server computer private key, and/or the second key derivation parameters. The cryptogram key can be generated using a shared secret that is generated using the second ephemeral public key, the server computer private key, and/or the second key derivation parameters. The cryptogram key can optionally be generated based on a second LUK that has been provided to the user device. The cryptogram key may be used to decrypt the received registration cryptogram. Where the second registration cryptogram is generated by encrypting the second one-time password using the cryptogram key, the received second registration cryptogram can be decrypted to determine whether the decrypted cryptogram matches the second registration data (e.g., one-time password) that has been provided to the user device. In some embodiments, rather than decrypting the received registration cryptogram, the received registration cryptogram can be compared with a stored registration cryptogram associated with the user device.

In some embodiments, the second registration data and optionally a secure element identifier (e.g., SIM ID) can be encrypted with the originally stored registration data (e.g., first registration data) using a key derived under the new shared secret. The encrypted value is then sent to the server for validation. Validation can includes decrypting the encrypted value using the new shared secret and validating both the original (first) registration data and the new (second) registration data in the decrypted value. Such validation provides the additional assurance that the requestor (e.g., user device) knows the first and second registration data, as well as the newly negotiated shared secret.

C. Example Key Renewal Flow

Figure 18:
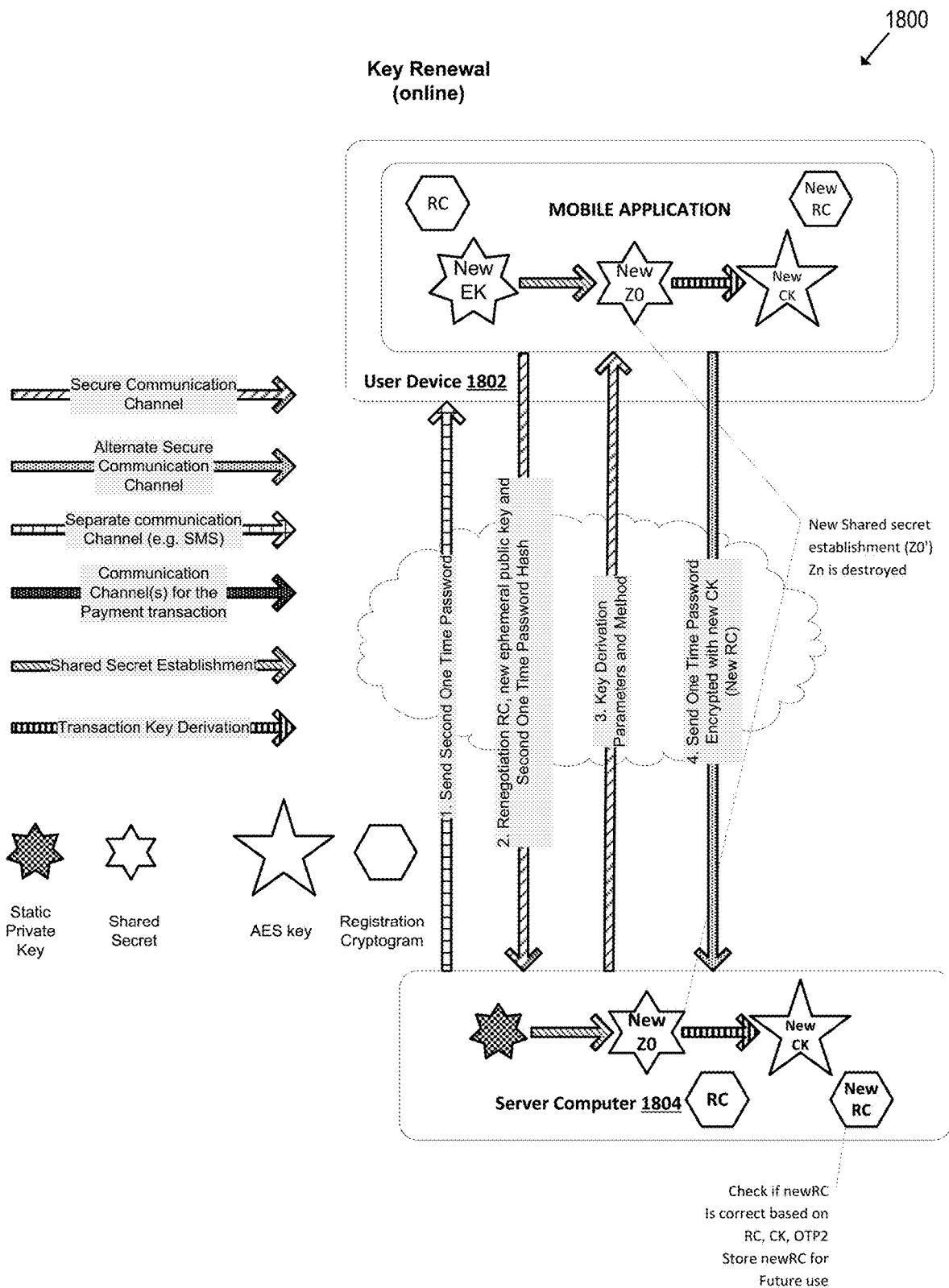
FIG. 18 shows a block diagram of a key renewal process, in accordance with some embodiments.

FIG. 18 shows a block diagram of a key renewal process 1800, in accordance with some embodiments. As shown in FIG. 18, four messages may be exchanged between user device 1802 (e.g., user device 101) and a server computer 1804 (e.g., payment processing network computer 105 or issuer computer 106) as part of a key renewal process.

In a first message, the server computer 1804 may provide to the user device 1802 a second registration data (e.g., one-time password). In some embodiments, the registration data (e.g., one-time password) may be provided using an alternate communications medium, such as SMS or email.

In a second message, the user device may provide a registration cryptogram (RC), a public key of a new ephemeral public/private key pair, and a hash of the received registration data (e.g., one-time password) to server computer 1804. The registration cryptogram (RC) may have been obtained during an initial enrollment process (e.g., in accordance with method 800). The server computer 1804 may verify the registration cryptogram and registration data (e.g., one-time password) hash to authenticate user device 1802.

In a third message, if user device 1802 is authenticated, the server computer 1804 may provide new key derivation parameters to user device 1102. In some embodiments, the server computer 1804 may optionally provision a new limited use key (LUK) to the user device 1802 as part of the key derivation parameters. The limited use key may be used to generate new cryptogram keys and/or new cryptograms (e.g., registration cryptograms and/or transaction cryptograms).

Prior to sending a fourth message, user device may derive a new shared secret (new $Z_0$) using the new ephemeral private key (EK) and a server computer public key, and use the new shared secret ($Z_0$) and new key derivation parameters to determine a new cryptogram key (new CK). In some embodiments, where a new LUK is provisioned by the server computer 1804, the new cryptogram key may also be generated based on the LUK. The new cryptogam key can then be used to generate a new registration cryptogram (new RC). For example, the new cryptogram can be used to encrypt the registration data (e.g., one-time password) sent to the user device 1802 in the first message. User device 1802 may then send the new registration cryptogram (new RC) to the server computer 1804. If the new cryptogram (new RC) is validated, key renewal may be completed successfully.

VI. Synchronization

A potential issue with the techniques described herein is the possibility of large numbers of interrupted transactions leading to many out of sync situations where the user device and the server computer have or expect different shared secrets. For example, access devices (e.g., NFC terminals) are sometimes unable to proceed with the authorization even though the user device or a payment application thereon has successfully completed the NFC transaction communication. As another example, it is sometimes unclear whether QR codes have been successfully scanned at all.

This out of synch issue may mitigated, at least in part, at the server side by allowing the server validation of the cryptogram to accept either the next cryptogram key (SUK) or the next n (where n=1, 2, 3, . . . ) cryptogram key(s) (e.g., SUK) upon rejection of the next cryptogram key. For example, if a validation of a cryptogram generated using the updated cryptogram key fails, the server may attempt to validate the cryptogram using the next+1 cryptogram key (derived from the next+1 shared secret), the next+2 cryptogram key (derived from the next+2 shared secret), or the like.

Additionally or alternatively, the user device may be configured to check synchronization against the server in the following manner. When the device is next online and after the second or later new shared secret is generated for the account, the last shared secret would be sent in to the server computer. The server can calculate or receive last shared secret if the server is notified of each new transaction event by user devices and/or server computers. In some embodiments, both the user devices and the servers need to store the method bitmaps for calculating the keys and cryptograms and/or the last shared secret(s) used for calculating the next shared secret(s) and next cryptogram(s). In some embodiments, some or all of the sensitive data such as the method bitmaps and/or the last shared secret(s) may be stored in a token vault configured to securely store payment tokens for transactions. Since the token vault is queried for each transaction, storing the sensitive data in the token vault may be preferred so as to improve efficiency (e.g., speeding up querying time). In such embodiments, the last shared secret may be checked against the token vault. In some other embodiments, the sensitive data may be stored in another data store that is not the token vault.

The server computer can maintain a list of shared secrets from last sync to identify whether out of sync condition is backward or forward. Device Account Out of Sync (forward) condition can be used to trigger an automatic re-sync without checking registration data as forward condition may be caused by incomplete device transactions that generates a new shared secret. Forward sync problem can occur when the user device generates next secrets without actually generating a transaction. Backward sync can occur when the server is ahead of the user devices. For example, some merchants do not actually send authorization requests to payment processors when the transactions actually occur. Instead, they batch up the authorization requests and send them later. This means that a consumer can have used their device for another transaction before the previous authorization request has been sent. As a result, the server may receive authorization requests for transactions that use an earlier secret after an authorization request using a later secret has been processed by the server. To cope with the problem, in some embodiments, the server may maintain a moving window of current secret and unused previous secrets. The server may then be able to look forward because the transaction may be using a future secret rather than the next secret. The larger the window, the less re-syncs will be necessary. The tradeoff may be a slower rate at which a server can handle transactions. In some embodiments, backward conditions can be used to trigger an alert as a possible attack because the same shared secret may be used more than once.

VII. Other Types of Transactions

In some embodiments, the techniques described herein can be used to authenticate transactions that do not relate to payments. For instance, a user device may communicate with a server computer in order to access one or more resources in one or more non-payment transactions. The server computer may be configured to authenticate the user device using the techniques described herein. The server computer may be further configured to provide access to the one or more resources based on the authentication result.

For example, the user device and the server computer may communicate during a provisioning process to provision credentials (e.g., a LUK) to the user device. The communications can be performed in the same manner as discussed above in FIGS. 4-12.

The provisioned credentials may be used in subsequent transactions to allow the user device to access resources provided by a server computer. The server computer can be the same server computer that enrolled the user device or a different server computer. The communications can be performed in the same manner as discussed above in FIGS. 16-19. For instance, the provisioned credentials (e.g., LUK and/or other key derivation parameters) can be used to generate a cryptogram key that may be used to generate a cryptogram that is used to authenticate the user device during a transaction. The cryptogram key can be generated further based on a shared secret that is updated for each transaction (e.g., a rolling shared secret). In such embodiments, the cryptogram key that is generated is a single use key that is only valid for a single transaction.

The credentials may be renewed during a renewal process such as discussed herein. In particular, a new credential (e.g., new LUK) may be provisioned onto the user device to be used for generating cryptograms and/or cryptogram keys. The communications can be performed in the same manner as discussed above in FIGS. 16-18. In some embodiments, the new LUK is provisioned in a secure manner similar to the provisioning of the LUK during the enrollment process.

In various embodiments, a resource may include computing resources that are accessible via a computing device. Such computing resources can include data objects, computing devices or hardware/software components thereof (e.g., CPU, memory, applications), services (e.g., web services), virtual computer systems, data storage or management, network connections and interfaces, the like. For example, a resource can include one or more computing devices (e.g., desktop, laptop, tablet, mobile phone), files or other data stored in the computing devices, memory or data storage device associated with the computing devices, applications installed on the computer devices, peripheral devices associated with the computing devices such as input/output devices (e.g., keyboard, mouse, microphone, touchscreen, printer), network interfaces, services provided by the computing devices, and the like. Computing resources can include online or cloud-based services or functionalities provided by service providers. Computing resource can include one or more storage devices, nodes, systems, or a portion thereof such as a partition, a volume, a sector, and the like. Computing resources can also include data objects such as credentials (e.g., username, passwords, cryptographic keys, digital certifications). In this case, a master credential may be required to access these credentials. A resource can include tangible and/or intangible resources. Tangible resources can include devices, buildings, and physical objects. Intangible resources can include services and time, for example.

VIII. Computer Apparatus

Figure 19:
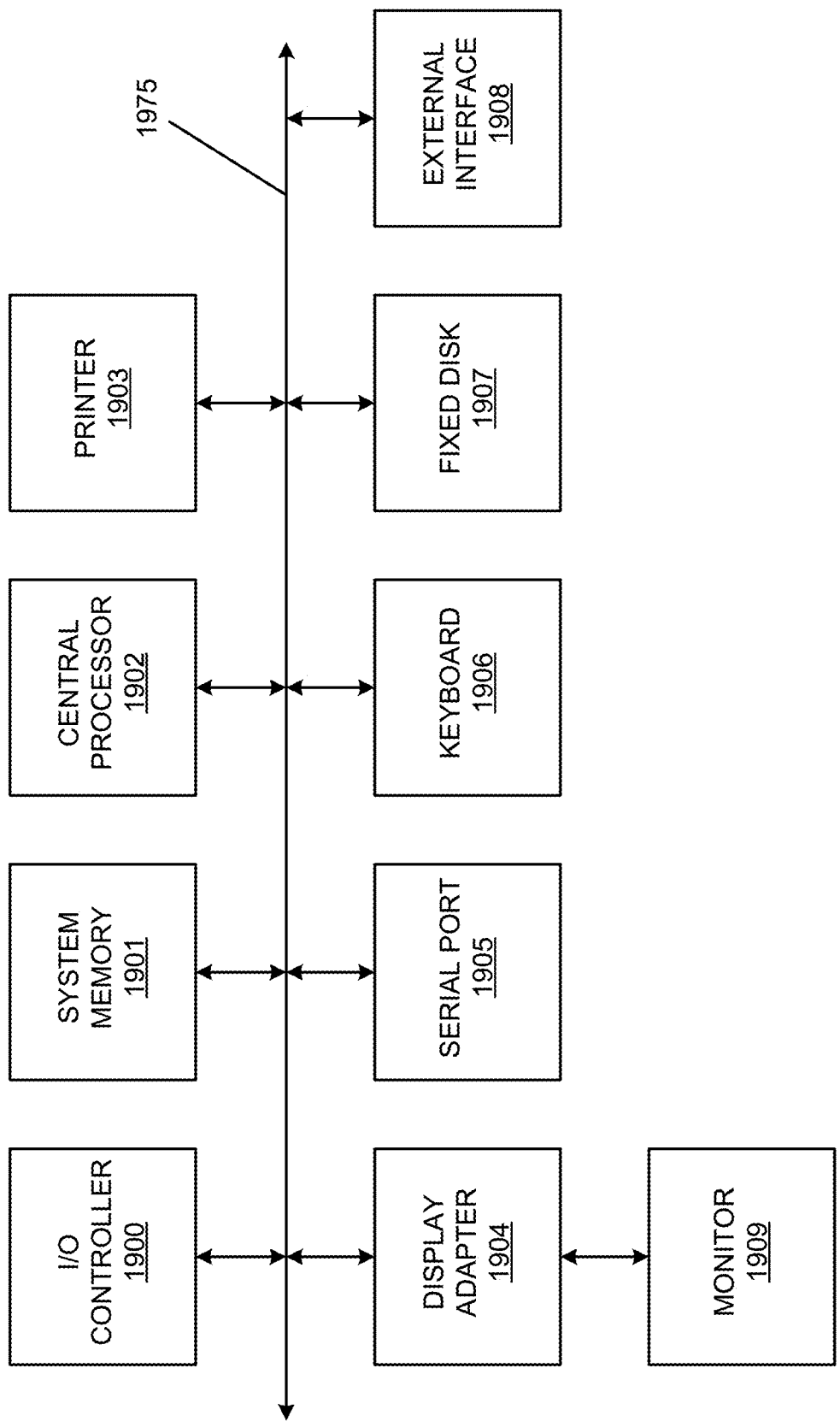
FIG. 19 shows a high level block diagram of a computer system that may be used to implement any of the entities or components described above.

FIG. 19 shows a high level block diagram of a computer system that may be used to implement any of the entities or components described above. The subsystems shown in FIG. 19 are interconnected via a system bus 1975. Additional subsystems include a printer 1903, keyboard 1906, fixed disk 1907, and monitor 1909, which is coupled to display adapter 1904. Peripherals and input/output (I/O) devices, which couple to I/O controller 1900, can be connected to the computer system by any number of means known in the art, such as a serial port. For example, serial port 1905 or external interface 1908 can be used to connect the computer apparatus to a wide area network such as the Internet, a mouse input device, or a scanner. The interconnection via system bus 1975 allows the central processor 1902 to communicate with each subsystem and to control the execution of instructions from system memory 1901 or the fixed disk 1907, as well as the exchange of information between subsystems. The system memory 1901 and/or the fixed disk may embody a computer-readable medium.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The above description is illustrative and is not restrictive. Many variations of the invention may become apparent to those skilled in the art upon review of the disclosure. The scope of the invention may, therefore, be determined not with reference to the above description, but instead may be determined with reference to the pending claims along with their full scope or equivalents.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, units, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of example embodiments of the invention has been presented for the purposes of illustration and description. It is not intended to be exhaustive or to limit the invention to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications, and descriptions mentioned herein are incorporated by reference in their entirety for all purposes. None is admitted to be prior art.

What is claimed is:

1. A computer-implemented method performed by a user device, the computer-implemented method comprising:
   receiving a message including an encrypted credential from a server computer;
   determining a response shared secret using a private key and a server public key;
   decrypting the encrypted credential using the response shared secret to determine a credential;
   obtaining a key derivation parameter from the credential;
   determining a first cryptogram key using the key derivation parameter;
   generating a first cryptogram using the first cryptogram key; and
   sending the first cryptogram to a second computer.

2. The computer-implemented method of claim 1, wherein the key derivation parameter is a limited use key.

3. The computer-implemented method of claim 2, wherein the determining the first cryptogram key includes deriving the first cryptogram key using the limited use key and a key derivation function.

4. The computer-implemented method of claim 1, wherein the private key is included in a key pair that further includes a public key, which is an ephemeral public key, and wherein the private key is an ephemeral private key.

5. The computer-implemented method of claim 1, wherein the determining the first cryptogram key further includes determining the first cryptogram key by using the response shared secret in addition to the key derivation parameter.

6. The computer-implemented method of claim 1, wherein the first cryptogram is for use in a first secure communication with the second computer that validates the first cryptogram.

7. The computer-implemented method of claim 1, further comprising:
generating a request shared secret using the private key and the server public key; and
encrypting request data using the request shared secret to obtain encrypted request data.

8. The computer-implemented method of claim 1, wherein the response shared secret is determined using a blinded key that is derived from the server public key, thereby using the server public key to determine the response shared secret, and wherein the message received from the server computer further includes the blinded key.

9. The computer-implemented method of claim 1, wherein the response shared secret is determined without a blinded key, wherein the credential includes a cryptographic nonce, and wherein the first cryptogram key is further derived using the cryptographic nonce.

10. The computer-implemented method of claim 1, further comprising:
updating the response shared secret to determine an updated shared secret using an update parameter, the credential including the update parameter;
determining a second cryptogram key using the updated shared secret and the key derivation parameter;
generating a second cryptogram using the second cryptogram key; and
conducting a second secure communication with a validation computer using the second cryptogram.

11. The computer-implemented method of claim 10, further comprising:
generating new shared secrets for each of a plurality of new secure communications, each new shared secret generated using a previous shared secret and the update parameter;
determining new cryptogram keys using the new shared secrets and the key derivation parameter;
generating new cryptograms using the new cryptogram key; and
conducting the new secure communications with the validation computer using the new cryptograms.

12. The computer-implemented method of claim 10, wherein the second cryptogram is further generated using data based on cryptogram derivation parameters included in the credential, wherein the second secure communication is an authorization request, and wherein the second cryptogram authenticates at least one element of the authorization request.

13. The computer-implemented method of claim 1, further comprising:
receiving first registration data;
encrypting the first registration data using the first cryptogram key to generate the first cryptogram, the first cryptogram being a registration cryptogram;
encrypting the registration cryptogram using the response shared secret; and
sending the registration cryptogram to the second computer that is a registration server computer, wherein the registration server computer authenticates the user device using the registration cryptogram.

14. The computer-implemented method of claim 1, wherein the second computer is the server computer.

15. A computer-implemented method performed by a server computer, the computer-implemented method comprising:
determining a request shared secret using a device public key of a user device and a static server private key;
generating a response shared secret using the static server private key and the device public key;
obtaining a key derivation parameter for determining a first cryptogram key from the response shared secret;
encrypting a credential using the response shared secret to determine encrypted response data, the credential including the key derivation parameter; and
sending to the user device, a message including the encrypted response data.

16. The computer-implemented method of claim 15, further comprising:
receiving, from the user device, a user cryptogram for validating a secure communication;
determining the first cryptogram key using the key derivation parameter;
generating a first cryptogram using the first cryptogram key and a cryptogram derivation parameter, the credential including the cryptogram derivation parameter; and
validating the user cryptogram by comparing the user cryptogram to the first cryptogram.

17. The computer-implemented method of claim 16, further comprising:
updating the response shared secret to determine an updated shared secret;
receiving, from the user device, a new cryptogram for validating a new secure communication;
determining a second cryptogram key from the updated shared secret using the key derivation parameter;
generating a second cryptogram using the second cryptogram key and the cryptogram derivation parameter; and
validating the new cryptogram by comparing the new cryptogram to the second cryptogram.

18. The computer-implemented method of claim 15, further comprising:
providing first registration data to the user device;
receiving a user registration cryptogram from the user device;
determining the first cryptogram key using the key derivation parameter;
encrypting the first registration data using the first cryptogram key to generate a first registration cryptogram; and
verifying the user registration cryptogram by comparing the user registration cryptogram to the first registration cryptogram, wherein the user device is authenticated if the first registration cryptogram is verified.

19. The computer-implemented method of claim 18, wherein the first registration data includes a one-time password, and wherein the user registration cryptogram is based on the one-time password.

20. A computer system comprising:
a memory that stores computer-executable instructions; and
a processor configured to access the memory and execute the computer-executable instructions to perform a method including:
receiving a message including an encrypted credential from a server computer;

determining a response shared secret using a private key and a server public key;
decrypting the encrypted credential using the response shared secret to determine a credential;
obtaining a key derivation parameter from the credential;
determining a first cryptogram key using the key derivation parameter;
generating a first cryptogram using the first cryptogram key; and
sending the first cryptogram to a second computer.

* * * * *